US012751880B2

(12) United States Patent
Griffith et al.

(10) Patent No.: US 12,751,880 B2
(45) Date of Patent: Oct. 6, 2026

(54) ISOLATION ROOM SYSTEMS AND METHODS

(71) Applicant: Carecubes Inc., San Francisco, CA (US)

(72) Inventors: Saul Thomas Griffith, San Francisco, CA (US); Brenton Piercy, San Francisco, CA (US); Pushan Panda, San Francisco, CA (US); Jacob Lacore, San Francisco, CA (US); Carrie Davis, San Francisco, CA (US); Hans von Clemm, San Francisco, CA (US)

(73) Assignee: CARECUBES INC., San Francisco, CA (US)

( * ) Notice: Subject to any disclaimer, the term of this patent is extended or adjusted under 35 U.S.C. 154(b) by 1203 days.

(21) Appl. No.: 17/459,564

(22) Filed: Aug. 27, 2021

(65) Prior Publication Data

US 2022/0062081 A1 Mar. 3, 2022

Related U.S. Application Data

(60) Provisional application No. 63/071,830, filed on Aug. 28, 2020.

(51) Int. Cl.
*A61G 10/00* (2006.01)
*A61G 10/02* (2006.01)

(52) U.S. Cl.
CPC ......... *A61G 10/005* (2013.01); *A61G 10/023* (2013.01)

(58) Field of Classification Search
CPC .... A61G 10/005; A61G 10/023; A61G 10/02; E04H 3/08; E04H 15/02; E04H 15/20;
(Continued)

(56) References Cited

U.S. PATENT DOCUMENTS 3,802,416 A 4/1974 Cazalis
5,314,377 A * 5/1994 Pelosi, III .............. F24F 3/167 135/93

(Continued)

FOREIGN PATENT DOCUMENTS

CN 101697933 B 7/2011
CN 111529222 A 8/2020

(Continued)

OTHER PUBLICATIONS

English Machine Translation of KR101668378B1, Lee Jae Won, Oct. 21, 2016 (see attached). (Year: 2016).*

(Continued)

*Primary Examiner* — Sunita Reddy
(74) *Attorney, Agent, or Firm* — Davis Wright Tremaine LLP

(57) ABSTRACT

An isolation enclosure for isolating a human in the surrounding area of a bed with a mattress laid on its frame, allowing the human to move freely within the isolation chamber that extends above the bed frame. The canopy forms a sealed isolation chamber against external air, equipped with wheels, casters, sliders, etc., for transporting the support frame, canopy, and bed, thereby transferring the patient on the bed within the isolation chamber. The environmental control device can be connected to the isolation chamber, featuring a filter for filtering at least one of the incoming air to the isolation chamber and the outgoing air from the isolation chamber, and a pump for performing at least one of the operations of sending air into the isolation chamber to increase the pressure inside the chamber above the external air pressure, and extracting air to lower the pressure inside the chamber below the external air pressure.

26 Claims, 31 Drawing Sheets

(58) Field of Classification Search
CPC ......... E04H 15/34; E04H 15/46; A41D 13/00; A41D 19/015
USPC ...................................................... 600/21–22
See application file for complete search history.

(56) References Cited

U.S. PATENT DOCUMENTS

| | | | | |
|---|---|---|---|---|
| 6,192,633 | B1 * | 2/2001 | Hilbert | E04H 15/20 52/87 |
| 6,241,653 | B1 | 6/2001 | Gauger et al. | |
| 6,461,290 | B1 * | 10/2002 | Reichman | A61G 10/005 5/6 |
| 8,186,775 | B2 | 5/2012 | Sheldon | |
| 10,302,318 | B1 | 5/2019 | Chambers | |
| 2003/0133834 | A1 * | 7/2003 | Karle | A61L 2/208 422/294 |
| 2005/0050804 | A1 | 3/2005 | Weidner | |
| 2006/0020159 | A1 | 1/2006 | Ellen | |
| 2007/0056593 | A1 * | 3/2007 | Kubicsko | A61F 5/3769 128/846 |
| 2007/0228692 | A1 * | 10/2007 | Kern | A61G 10/00 280/403 |
| 2011/0285257 | A1 * | 11/2011 | Sheldon | B25J 21/02 16/2.2 |
| 2012/0325279 | A1 * | 12/2012 | Munoz | B08B 15/026 135/96 |
| 2015/0218833 | A1 * | 8/2015 | Ballantyne | E04H 1/1277 52/79.1 |
| 2016/0074268 | A1 * | 3/2016 | Breegi | A61G 11/009 600/21 |
| 2016/0128886 | A1 * | 5/2016 | Merino | E04H 1/1277 600/21 |
| 2016/0136024 | A1 | 5/2016 | Poenisch et al. | |
| 2016/0151218 | A1 * | 6/2016 | Canty | A61G 7/047 600/21 |
| 2019/0183709 | A1 * | 6/2019 | Poenisch | A61B 42/30 |
| 2019/0380891 | A1 * | 12/2019 | Anandasabapathy | E04H 3/08 |
| 2020/0060359 | A1 | 2/2020 | Jascomb et al. | |
| 2020/0337922 | A1 | 10/2020 | Breegi et al. | |
| 2021/0298979 | A1 | 9/2021 | Klein et al. | |
| 2023/0149235 | A1 | 5/2023 | Monty et al. | |
| 2023/0329945 | A1 | 10/2023 | Jenkner et al. | |

FOREIGN PATENT DOCUMENTS

| | | | |
|---|---|---|---|
| JP | S4891819 | U | 11/1973 |
| JP | S4923668 | U | 2/1974 |
| JP | H0956757 | A | 3/1997 |
| JP | 2008508948 | A | 3/2008 |
| JP | 2011234929 | A | 11/2011 |
| JP | 2017534410 | A | 11/2017 |
| KR | 101646524 | B1 | 8/2016 |
| KR | 10-2022-0075909 | A | 6/2022 |
| RU | 39108 | U1 | 7/2004 |
| WO | 2016079514 | A1 | 5/2016 |
| WO | 2022047226 | A1 | 3/2022 |

OTHER PUBLICATIONS

Guidelines for Environmental Infection Control in Health-Care Facilities, Lynne Sehulster and Raymond Y.W. Chinn , CDC, 2003, pp. 1-10 and 33 (see attached) (Year: 2003).*
European Patent Office Extended Search Report dated Sep. 2, 2024, Application No. 21862866.7, 8 pages.
International Search Report and Written Opinion mailed Dec. 9, 2021, Patent Application No. PCT/US2021/048050, 11 pages.
Japan PTO Decision on Final Action dated Sep. 18, 2025, Application No. 2023-538876, 4 pages.
Japan PTO Office Action dated May 27, 2025, Application No. 2023-538876, 4 pages.
Korea PTO Office Action dated Jun. 20, 2025, Application No. 10-2023-7009784, 8 pages.
Australia IP Examination Report dated Mar. 26, 2026, Application No. 2021333899, 5 pages.
Korea PTO Office Action dated Mar. 30, 2026, Application No. 10-2023-7009784, 4 pages.
European Patent Office Communication pursuant to Article 94(3) EPC dated Feb. 17, 2026, Application No. 21862866.7, 5 pages.
International Search Report and Written Opinion mailed Apr. 14, 2026, Patent Application No. PCT/US2025/058730, 10 pages.

* cited by examiner

ISOLATION ROOM SYSTEMS AND METHODS

CROSS-REFERENCE TO RELATED APPLICATIONS

This application is a non-provisional of and claims the benefit of U.S. Provisional Application No. 63/071,830, filed Aug. 28, 2020, entitled "Negative Pressure Isolation Unit for Rapid Deployment During a Pandemic". This application is hereby incorporated herein by reference in its entirety and for all purposes.

Figure 1:
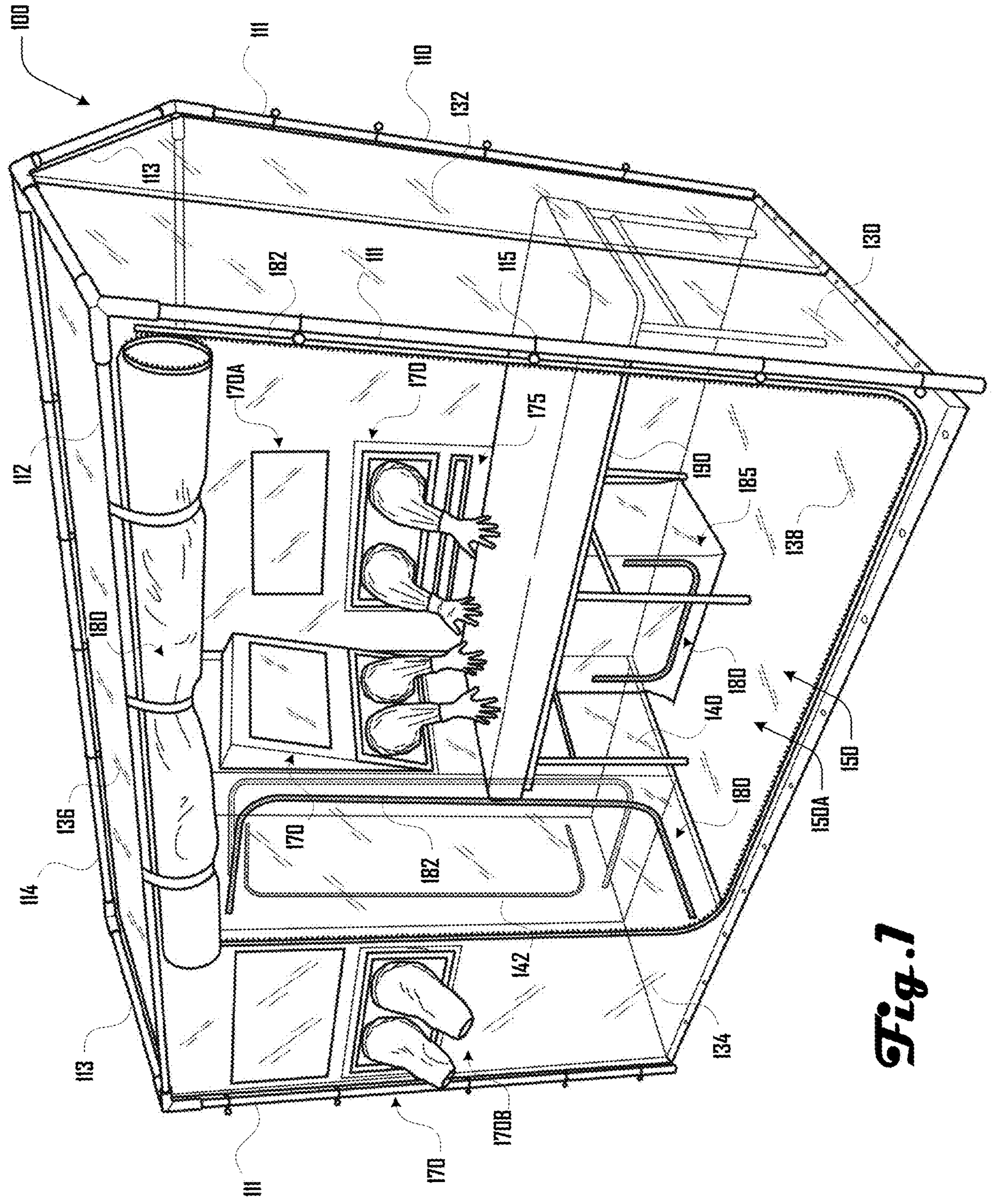
FIG. 1 is an exemplary perspective view of an embodiment of an isolation room system with a roll-up door that provides access to a primary chamber where a patient can be isolated.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Bio-secure isolation rooms can be key pieces of equipment that can provide a safe working environment when treating patients with infectious diseases or people under investigation for having an infectious disease. In various embodiments, such an isolation room can comprise one or more chambers that are sealed relatively air-tight and a fan or air handling system that pulls air from at least one of the one or more chambers, filters the air and directs the air to a location external from the isolation room. The negative pressure created in the isolation room can allow for small leaks in the isolation room system by drawing air into the room from such leaks, and therefore into the filtration system, instead of pushing possibly dangerous air out of the opening of such leaks.

Conventional bio-containment systems can be expensive and time consuming to install, making them inaccessible to areas with limited financial resources and ineffective during times of crisis when many isolation room systems need to be deployed quickly. The present disclosure presents examples of isolation room systems and methods in accordance with some embodiments that can be low cost to manufacture, safe to operate, readily transportable and rapidly deployable in times of need.

Various embodiments can include an isolation room system that can be made of thin polymer films such that can be folded and stored until it is needed. When deployed, various examples of an isolation room system can be connected to a rigid pole framework architecture, held up by a positively pressured inflatable structure, or the like. Various examples can be manufactured of thin film polymer sheets that are designed to allow the use of standard decontamination procedures such as UV, chemical, or mechanical cleaning. Some embodiments can include an external fan assembly that draws the air from inside the isolation room system through a filtration system adequate enough to provide removal of harmful particles such as droplets, bodily fluids, airborne infectious particles, and the like.

Turning to FIGS. 1-6, embodiments of an isolation room system 100 are illustrated that include an architecture 110 that supports a plurality of walls 130, which in some examples can comprise transparent or translucent flexible polymer sheets such as polyvinyl chloride (PVC), high-density polyethylene (HDPE), Vinyl, thermoplastic urethane (TPU) or the like. The walls 130 can define one or more chambers 150 and can include elements such as one or more interfaces 170, pass-throughs 175, doors 180, airlocks 185, and the like. The one or more chambers 150 can be configured to hold various medical, hygiene, other equipment such a bed 190, toilet 290, and the like.

As shown in the examples of FIGS. 1 and 3-6, the architecture 110 can comprise a plurality of rigid poles that can include a plurality of vertical poles that define corners of the isolation room system 100 with top-of-wall beams 112, rafters 113 and ridge beams 114 supporting a roof structure. The architecture 110 can be made of various suitable materials such as metal, wood, plastic, or the like. While some embodiments of the architecture 110 include rigid poles, further embodiments can include an architecture 110 defined in various other suitable ways, including via inflatable structures. An example of a rapid deployment via an inflatable architecture 110 can be similar to life-raft or inflatable slide for aircraft where a box is placed in the room where the isolation room system 100 is to be deployed and a cord is pulled, inflating the isolation room system 100 with stored gas from a canister. Additionally, various suitable configurations of an architecture 110 can be used in further embodiments, and in some embodiments, an architecture 110 can be absent (e.g., the isolation room system 100 can be self-supported or tied to and supported by external structures such as trees, structural elements of a building, or the like).

Returning to the example embodiments of FIGS. 1-6, the walls 130 of the isolation room system 100 can be joined to and supported by the architecture 110 in various suitable ways including via a plurality of couplings 115, which in some examples can include bungie ties, zip ties, ropes, magnets, hook and loop tape (e.g., Velcro), adhesives, welds, or the like. In various embodiments, the isolation room system 100 can have a polyhedron shape with walls 130 that include end-walls 132, sidewalls 134, roof walls 136, a floor wall 138 and one or more internal walls 140. While various embodiments of an isolation room system 100 can have a polyhedron shape as in FIGS. 1-6, further embodiments can include any suitable shapes or configurations, including curved or circular walls 130, so the present examples should not be construed to be limiting on the wide variety of other morphologies of an isolation room system 100 that are within the scope and spirit of the present disclosure.

Figure 2:
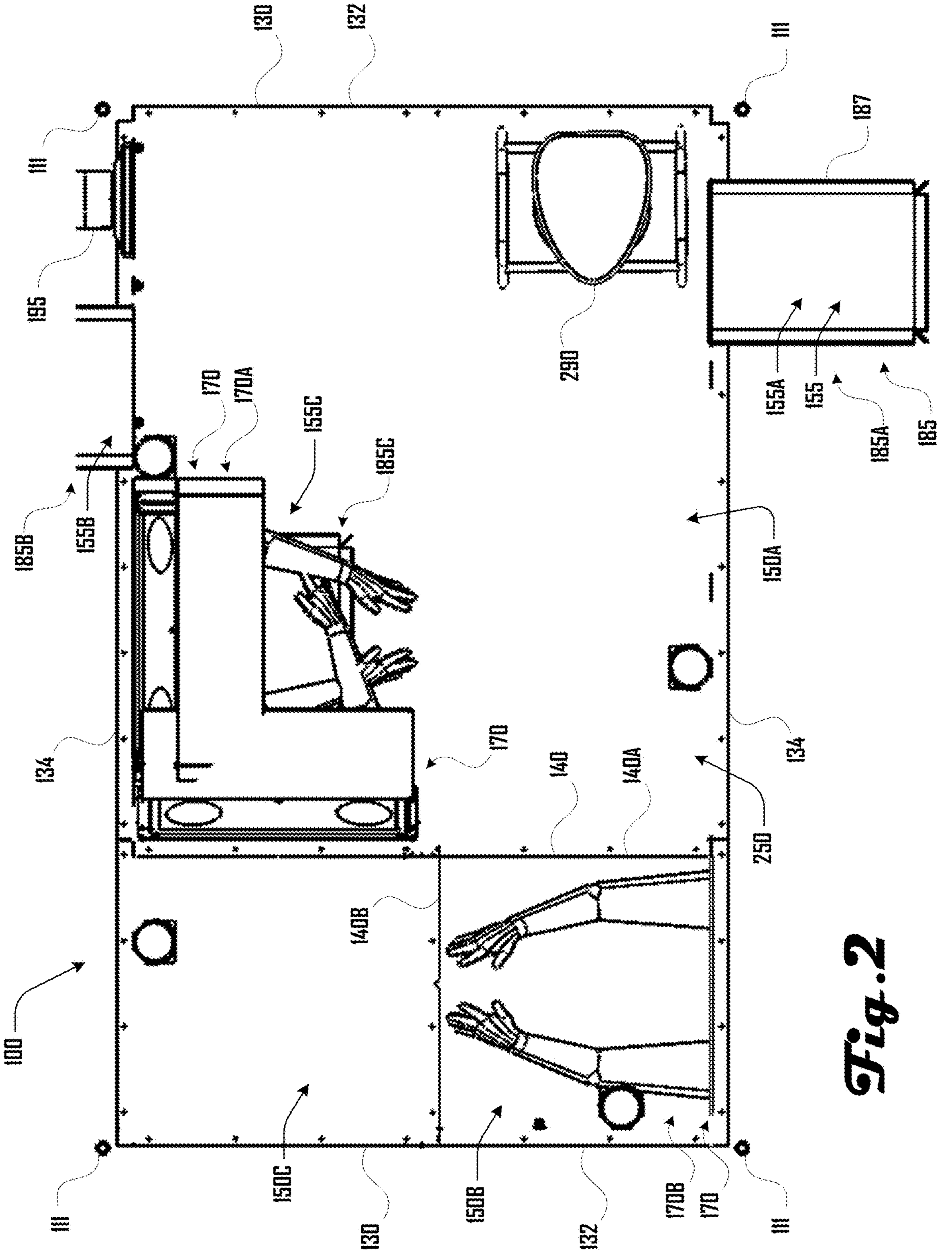
FIG. 2 is a top-down view of another embodiment of an isolation room system that includes a first, second and third chamber.
Figure 3:
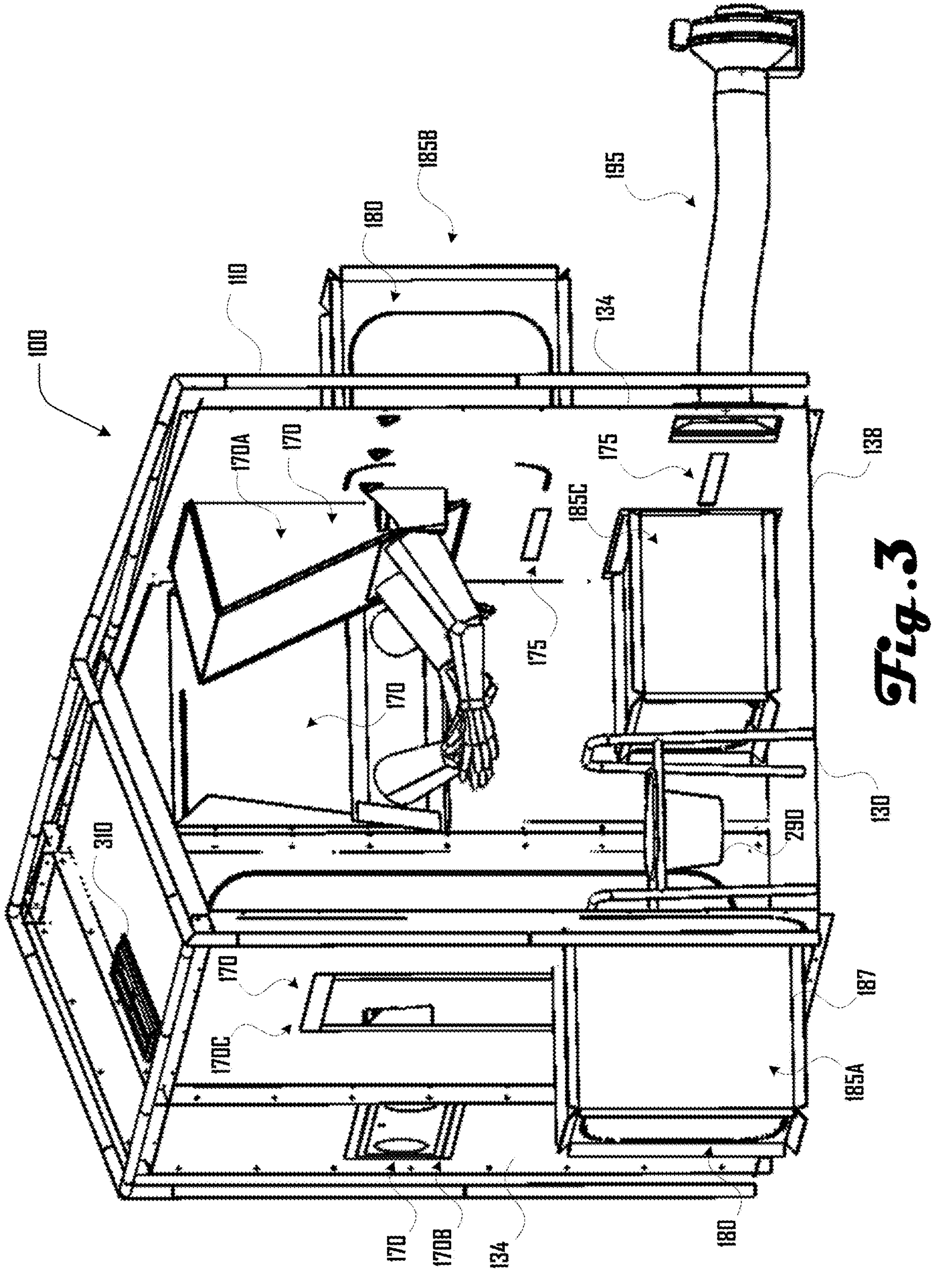
FIG. 3 is a cut-away side view of another embodiment of an isolation room system.
Figure 4:
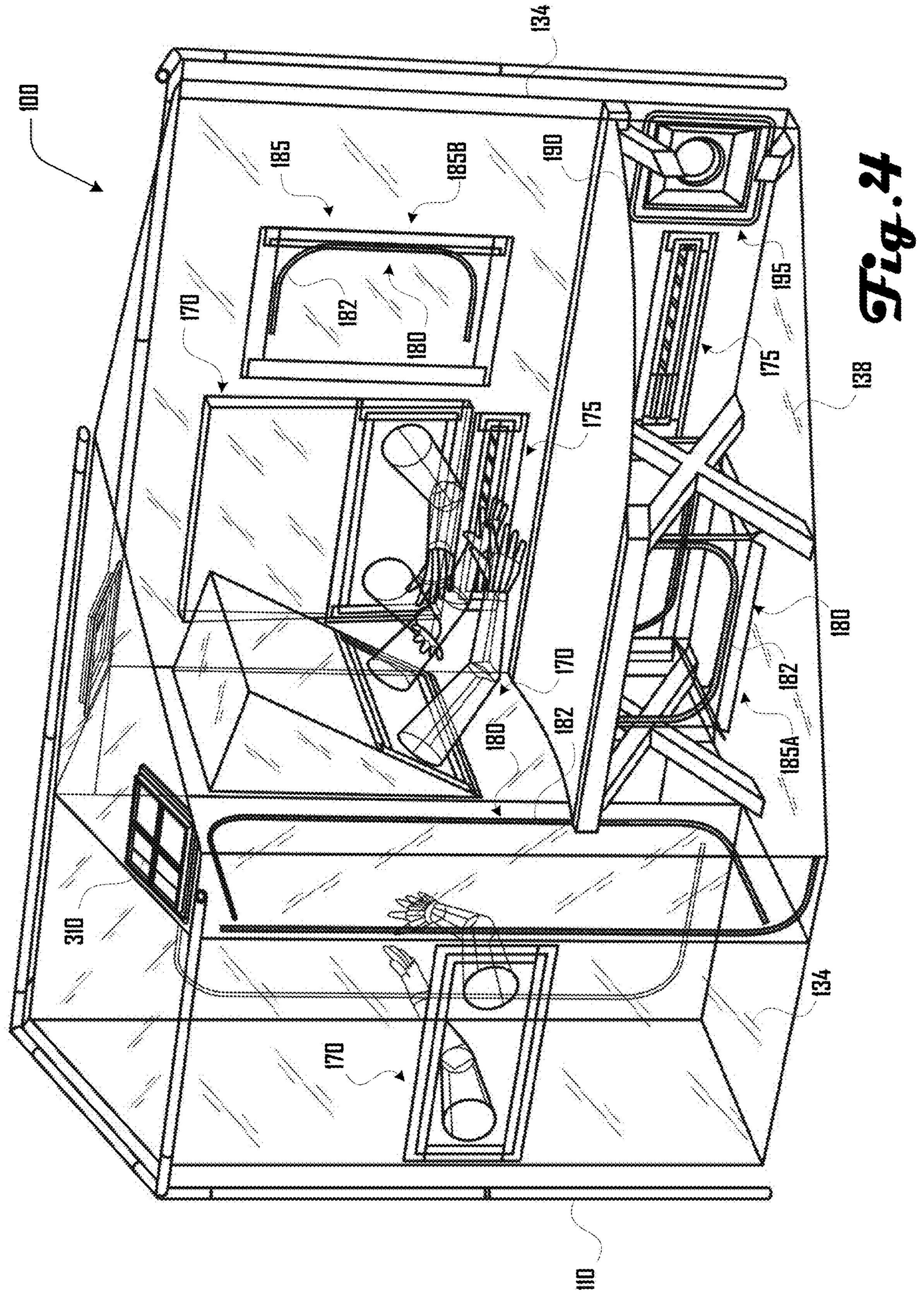
FIG. 4 is a cut-away side view of a further embodiment of an isolation room system.

FIG. 2 is top down view of an isolation room system 100, which illustrates an embodiment where the walls 130 define a first, second and third chamber 150A, 150B, 150C, where the first chamber 140A is defined at least in part by an end-wall 132, portions of two sidewalls 134, and a first internal wall 140. The second chamber 150B can be defined by a portion of an end-wall 132, a portion of a sidewall 134, a portion of the first internal wall 140 and a second internal wall 140B. The third chamber 150C can be defined by another portion of the end-wall 132, a portion of another sidewall 134, another portion of the first internal wall 140 and the second internal wall 140B. Accordingly, at least in the example of FIG. 2, the second and third chambers 150B, 150C (e.g., antechambers) can be disposed adjacent to the first chamber 150A (e.g., primary chamber), with a combined length of the second and third chambers 150B, 150C being the same as a width of the first chamber 150A (e.g., the length of the end-walls 132 and first internal wall 140A.

The first, second and third chambers 150A, 150B, 150C can serve various function in certain embodiments. For example, in one embodiment, the first chamber 150A can act as a primary isolation chamber where a patient remains isolated from the external environment (e.g., in a bed 190) with the second and third chambers 150B, 150C allowing for persons treating, visiting, or otherwise interacting with the patient to enter the isolation room system 100 and eventually enter the first chamber 150A. Similarly, the second and third chambers 150B, 150C can allow for persons treating, visiting, or otherwise interacting with the patient to exit the first chamber 150A and eventually leave the isolation room system 100. In one preferred embodiment, the isolation room system 100 can have dimensions of 10'×10'×7'. Further embodiments can have dimensions in the range of 9'-11'×9'-11'×8'-9'. Some embodiments can be approximately 12'×7'×9' and some embodiments can be approximately 5'×5'×8'.

For example, to enter the isolation room system 100, a doctor can open a door 180 in a wall 130 of the third chamber 150C (e.g., in an end or sidewall 132, 134), enter the third chamber 150C and close the door 180 to the third chamber 150C. The doctor can then open a door 180 in a wall 130 of the second chamber 150B (e.g., in the second internal wall 140B), enter the second chamber 150B and close the door 180 to the second chamber 150B. The doctor can then open a door 180 in a wall 130 of the first chamber 150A (e.g., in the first internal wall 140A), enter the first chamber 150A and close the door 180 to the first chamber 150A.

In some embodiments, the doctor can enter the isolation room system 100 with personal protective equipment (PPE) already donned, and in some embodiments, the doctor can enter the third chamber 150C without PPE, enter the second chamber 150B without PPE, don PPE in the second chamber 150B, and then enter the first chamber 150A with PPE donned so that the doctor can safely interact with the patient isolated in the first chamber 150A without being exposed to viral, bacterial or toxic elements associated with the isolated patient.

Additionally, it can be desirable for such viral, bacterial or toxic elements to remain within the isolation room system 100 and be prevented from leaving the isolation room system 100, including by transmission while a user is leaving the isolation room system 100 after visiting the isolated patient in the first chamber 150A. For example, in some embodiments, a doctor wearing PPE can interact with an isolated patient in the first chamber 150A, and to leave, the doctor can open a door 180 in a wall 130 of the first chamber 150A (e.g., in the first internal wall 140A), enter the second chamber 150B and close the door 180 to the first chamber 150A.

While in the second chamber 150B, the doctor can doff the PPE and can leave it in the second chamber (e.g., in a used PPE receptacle). In some embodiments, doffing the PPE in the second chamber 150B can include applying a disinfecting or washing fluid to the PPE (e.g., bleach solution). In some embodiments, the doctor can be assisted in doffing the PPE by a user on the outside of the isolation room system 100 via one or more interfaces 170 (e.g., disposed in a wall 130 of the second chamber 130), which may include arm interfaces, which are discussed in more detail herein. Similarly, users can be assisted with donning PPE in the second chamber 150B via such one or more interfaces 170.

After doffing the used PPE, the doctor can then open a door 180 in a wall 130 of the second chamber 150B (e.g., in the second internal wall 140B), enter the third chamber 150C and close the door 180 to the second chamber 150B. In various embodiments, the doctor can then leave the third chamber 150C to exit the isolation room system 100 by opening a door of the third chamber 150C (e.g., in a side or end wall 132, 134).

Figure 14:
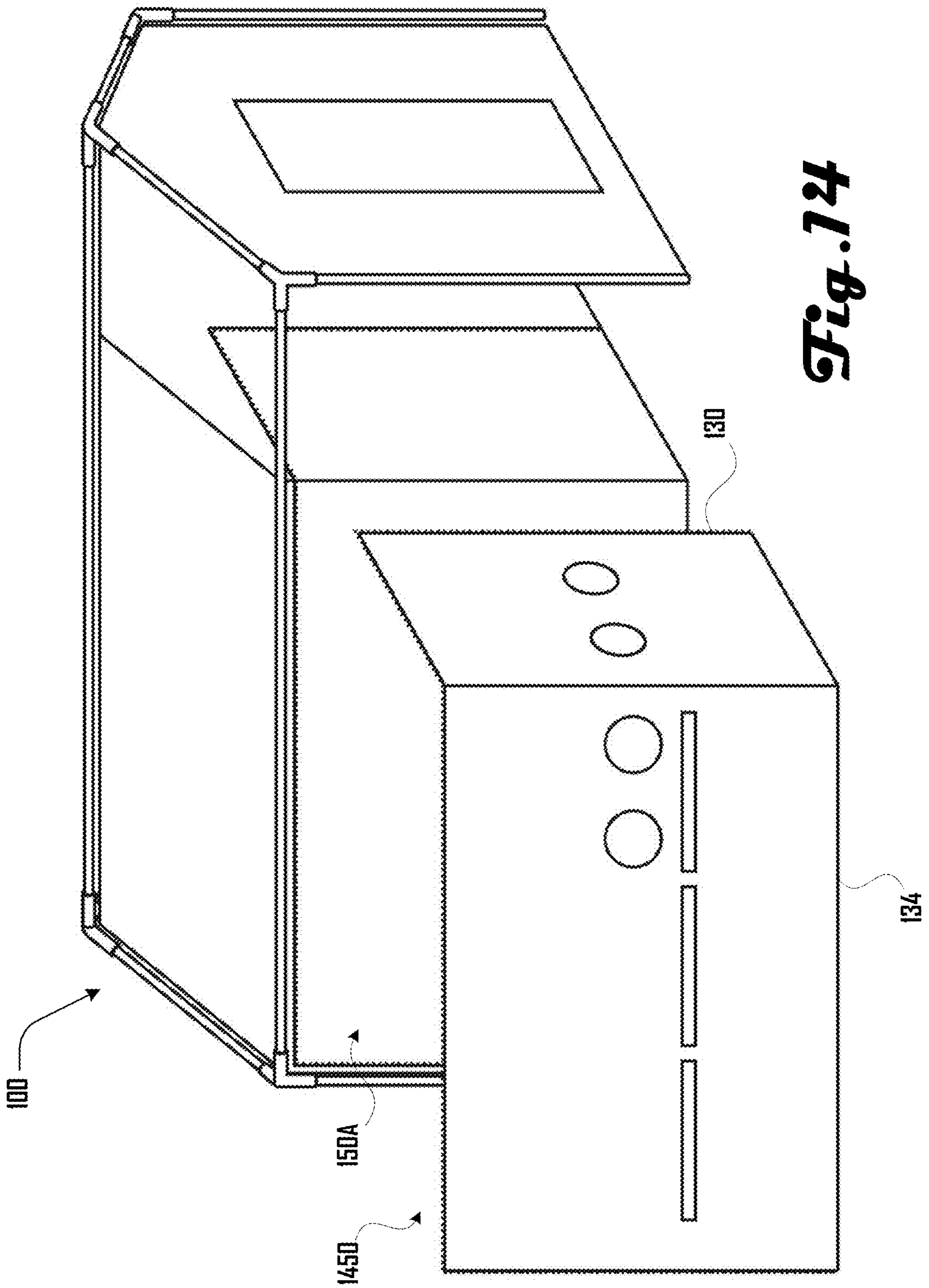
FIG. 14 illustrates an embodiment of an isolation room system having a removable wall section.

A patient can be introduced to the isolation room system 100 for isolation in various suitable ways. For example, in some embodiments, the patient to be isolated can enter the first chamber 150A of the isolation room system 100 via the third and second chambers 150C, 150B as discussed herein. In some embodiments, a patient to be isolated can enter the first chamber 150A via the third and second chambers 150C, 150B as discussed herein. However, in some embodiments a patient to be isolated can enter the first chamber 150A directly via a door 180 to the first chamber 150A (see e.g., FIG. 1), which can include a door 180 in the end and/or side walls 132, 134. In some embodiments, one or more walls 130 can be removable from the isolation room system 100, which can allow a patient to be isolated to enter the first chamber 150A and then one or more walls 130 can then be replaced with the patient isolated inside. For example FIG. 14 illustrates an example of an isolation room system 100 having a wall insert 1450 that can be coupled to the isolation room system 100 to seal a patient to be isolated within the first chamber 150A.

To maintain isolation of the patient within the isolation room system 100 and to prevent viral, bacterial or toxic elements associated with the patient from escaping the isolation room system 100, it can be desirable for direct access to the first chamber 150A (e.g., a door 180, wall insert 1450, or the like) to only be opened to allow the patient to be isolated to enter the isolation room system 100 and not be opened again until the isolated patient is to be removed from the isolation room system 100 based on not being contagious anymore, being moved to another treatment location, or the like. In other words, to maintain a safe external environment, it can be desirable to not open any doors 180 or wall inserts 1450 that provide direct access to the first chamber 150A such as to let doctors, nurses, or the like to enter or leave the isolation room system 100 or to temporarily allow a patient to leave isolation within the first chamber 150A.

In various embodiments, it can be desirable for a door 180 or wall insert 1450 that provides direct access to the first chamber 150A to be sized to allow non-ambulatory patients to be placed in the room via a mobile bed, gurney, wheelchair, or the like. For example, such access portals can be configured and sized to be large enough for a mobile bed, gurney, wheelchair, or the like to be wheeled into the first chamber 150A (e.g., so that a prone or supine human adult patient can be wheeled into the first chamber 150A). For example, bottom portions of such an access portal near the base wall 138 can lack a rim, wall portion, or the like that would not block wheels of a mobile bed, gurney, wheelchair, or the like.

Additionally, in various embodiments, other doors 180 (or access portals) and/or chambers 150 may be sized and/or configured to not be compatible with ingress or egress via a mobile bed, gurney, wheelchair, or the like. For example, referring to the example of FIG. 2, in some embodiments, the second and third chambers 150B, 150C may be too small to accommodate a mobile bed, gurney, wheelchair with patient and assistant, or the like. Similarly, in various embodiments, doors 180 to the second and/or third chambers 150B, 150C may be too small and/or not configured to accommodate a mobile bed, gurney, wheelchair with patient and assistant, or the like. For example such doors 180 may be wide enough to accommodate a person walking through the door, but not wide enough to accommodate a mobile bed, gurney, wheelchair, or the like. Similarly, bottom portions of such doors 180 the base wall 138 can have a rim, wall portion, or the like that would block wheels of a mobile bed, gurney, wheelchair, or the like, but that a walking user could easily step over.

Figure 5:
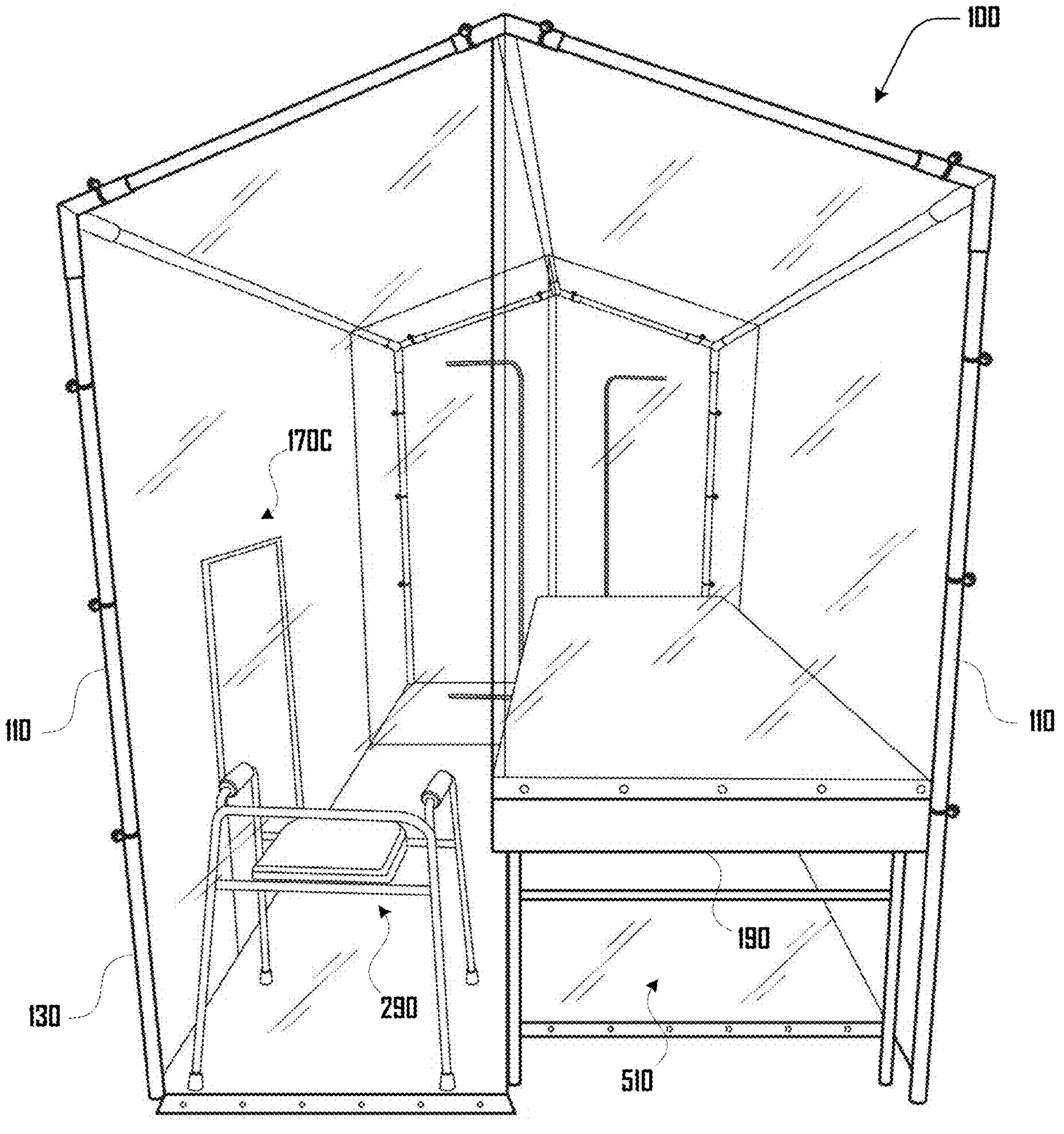
FIG. 5 is an end view of an embodiment of an isolation room system where a bed defines a portion of a primary chamber where a patient can be isolated.
Figure 6:
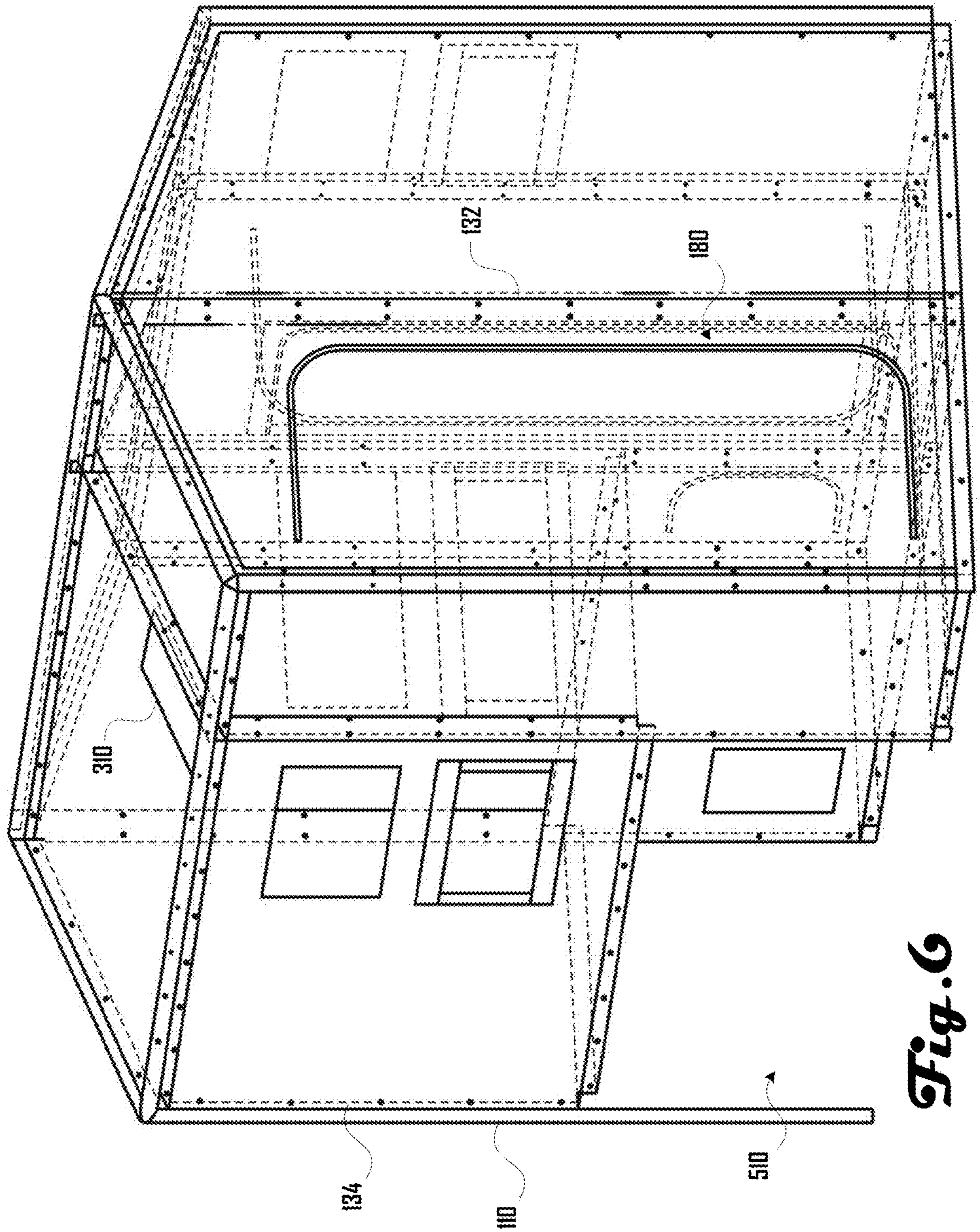
FIG. 6 is a perspective view of another embodiment of an isolation room system where a bed defines a portion of a primary chamber where a patient can be isolated.

While some examples can allow for a bed 190 to be rolled into or erected within the isolation room system 100, in some embodiments the isolation room system 100 can define a bed portion that is an integral or structural or portion of the isolation room system 100 (e.g., defining a portion of the first chamber 150A. Examples of such embodiments are illustrated in FIGS. 5 and 6.)

Doors 180 can be configured in various suitable ways. For example in the embodiments of FIGS. 1 and 3-6, various doors 180 can be defined by a C-shaped seal 182 in a portion of a wall 130 where opening the seal 182 can provide for opening the door 180 and closing the seal 182 can provide for closing the door 180. Seals 182 can include various suitable elements, including a zipper, hook and loop tape, magnets, an adhesive, or the like. In various embodiments, such door seals 182 can provide an airtight seal, a substantially airtight seal, or a seal with minimal openings such that a negative pressure applied to the isolation room system 100 can still be maintained with air only moving into the isolation room system 100 via such minimal openings.

An air filtration system 195 can be included and can meet or exceed a 15 air-exchanges-per-hour (ACH) CDC guidelines for surgical procedure and delivery rooms. Some examples can include a 0.3 micron HEPA exit filter and one or more MERV intake filters 310 that in some embodiments can be welded directly to one or more walls 130. In some embodiments a negative pressure can be generated in the isolation room system 100 (or portions thereof such as in at least the primary chamber 150A) of between −2.5 to −2.7 Pascals, between −2.2 to −3.0 Pascals, less than or equal to −2.2, −2.5, −2.7, −3.0, −3.5, −4.0 Pascals, or the like.

As discussed herein, embodiments can include various types of interfaces 170 that allow users on the outside of an isolation room system 100 to interface with a user and/or isolated patient within the isolation room system 100 (or vice-versa in some examples) and/or for a user in one chamber 150 to interact with a user and/or isolated patient within another separate chamber 150. Examples of interfaces 170 can include a lean-in glove panel interface 170A, a glove panel interface 170B and a hug suit interface 170C.

Figure 9:
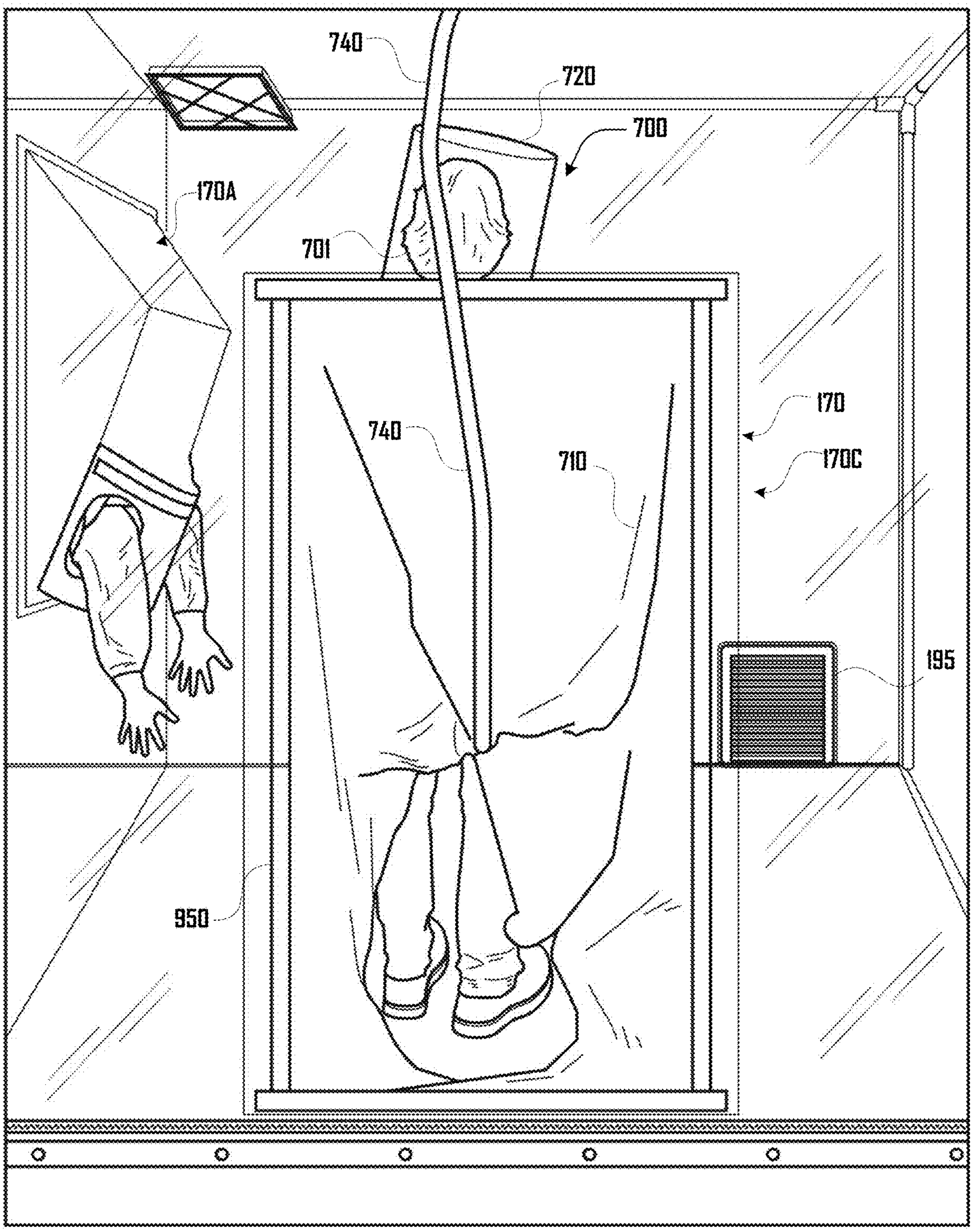
FIG. 9 is an external side view of a hug suit interface of an isolation room system.
Figure 10:
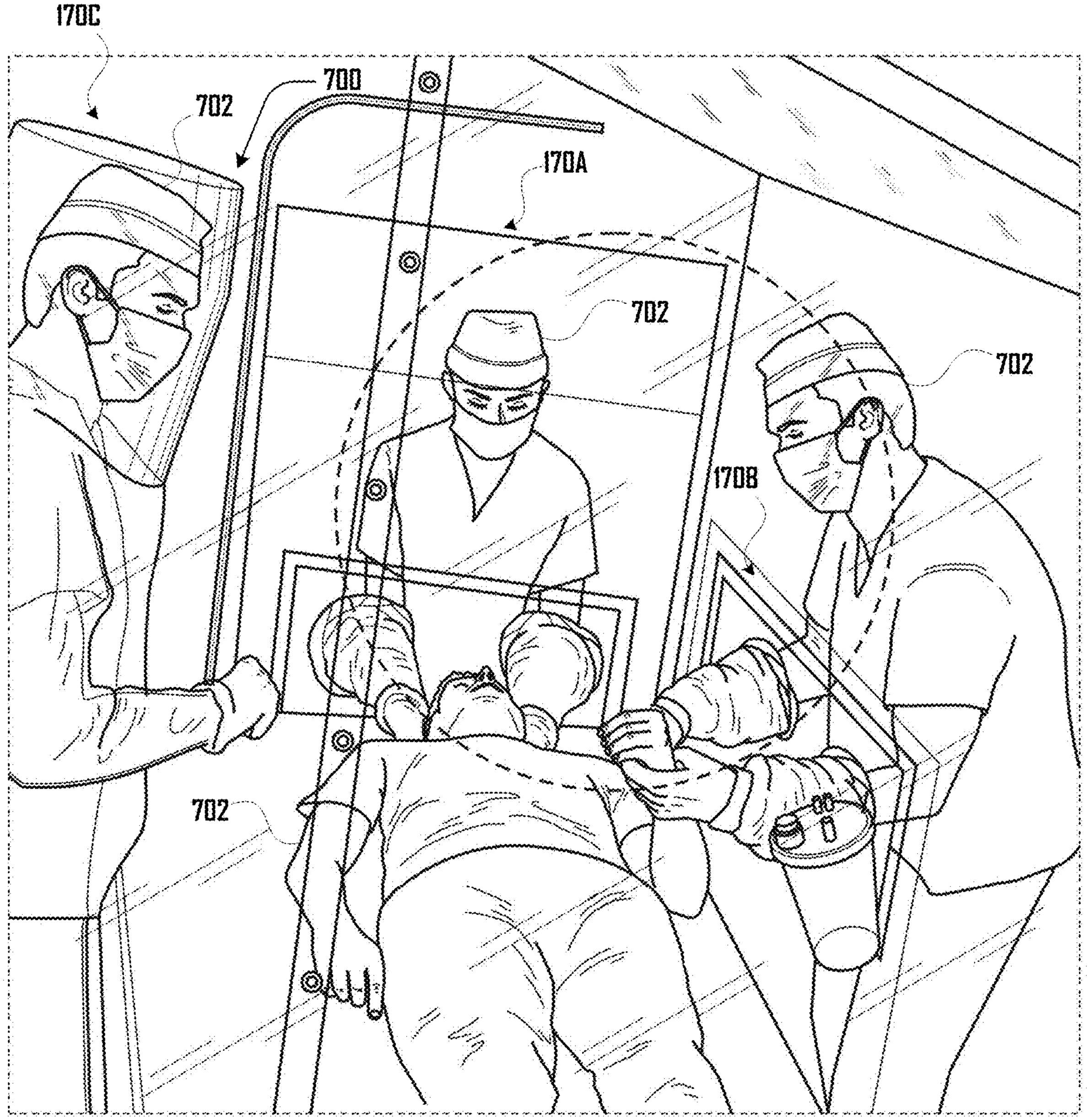
FIG. 10 illustrates an example of two users interacting with an isolated patient via a pair of lean-in glove interfaces and a third user in a hug suit interface.

For example, FIGS. 1-4 illustrate an example of embodiments having two lean-in glove panel interfaces 170A with a first being disposed in a sidewall 134 and extending from outside the isolation room system 100 into the first chamber 150A, with a second being disposed in the first internal wall 140A extending from the third chamber 150C into the first chamber 150A. Additional embodiments that include one or more lean-in glove panel interfaces 170A are shown in FIGS. 9-11.

Figure 11:
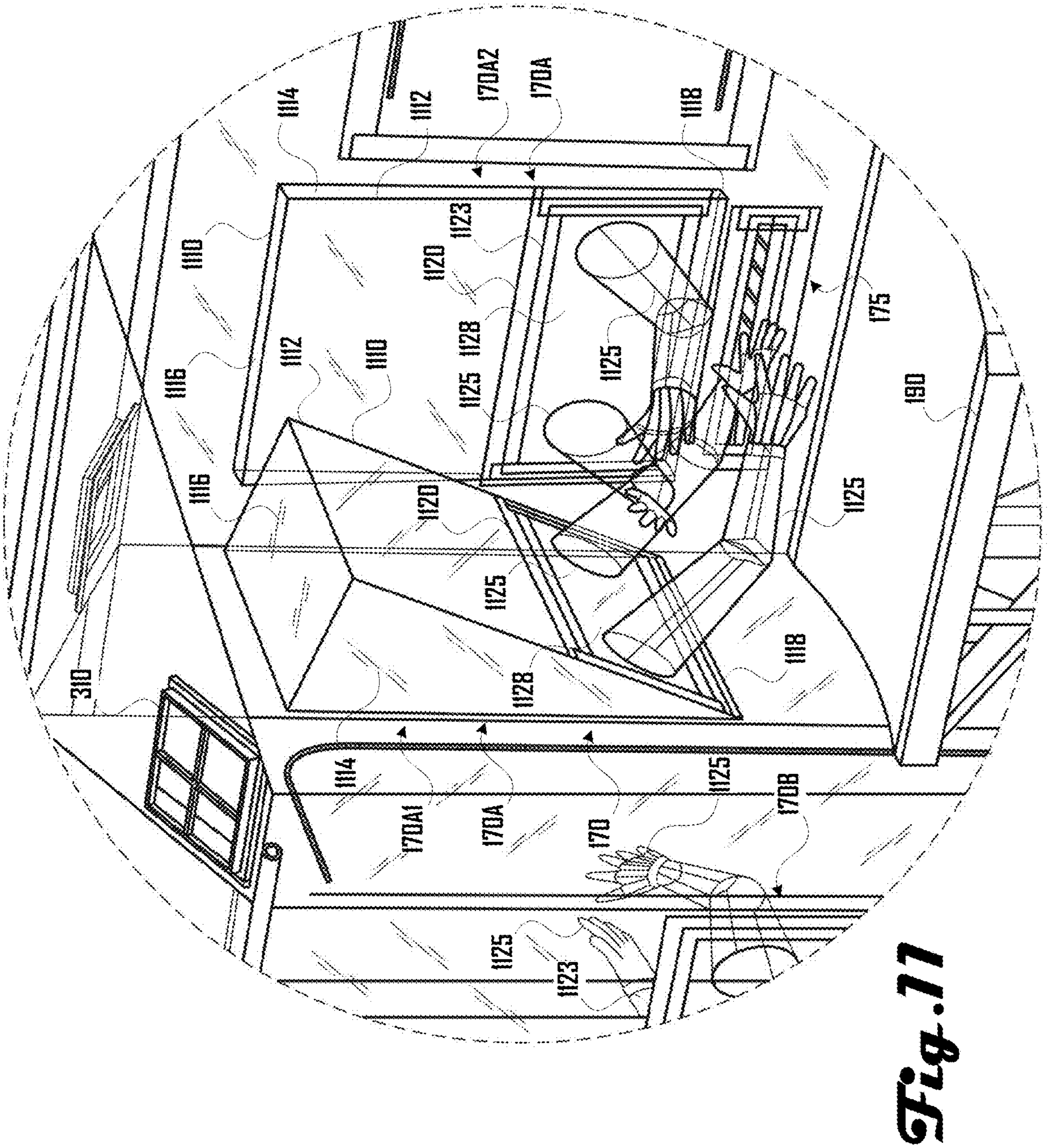
FIG. 11 is a close-up view of a pair of lean-in glove interfaces with one lean-in glove interface extending with the primary chamber and the second lean-in glove interface being retracted toward a wall.

Referring to FIG. 11, some embodiments of a lean-in glove panel interface 170A can comprise a lean-in body 1110 having a front panel 1112, a pair of opposing sidewalls 1114 and a top panel 1116, with a glove panel interface 1120 disposed within the front panel 1112. The glove panel interface 1120 can be surrounded by an interface frame 1123 with a pair of gloves 1125 extending from a glove panel 1128. The front panel 1112 can be rotatably coupled to the wall 130 via a hinge 1118, which can allow the front panel 1112 to rotate toward and away from the wall 130 in which the lean-in glove panel interface 170A is disposed. For example, FIG. 11 illustrates a first lean-in glove panel interface 170A1 where the front panel 1112 is rotated away from the wall 120 and extending into the first chamber 150A and illustrates a second lean-in glove panel interface 170A2 where the front panel 1112 is rotated toward the wall 120.

Such an embodiment of a lean-in glove panel interface 170A can be desirable by allowing a user (e.g., doctor, nurse, etc.) to be able to lean in and over a patient isolated in the isolation room system 100 by extending the lean-in glove panel interface 170A into the first chamber 150A, which can improve the user's ability to view and interact with the isolated patient. Additionally, being able to retract the lean-in glove panel interface 170A toward the wall can be desirable for maximizing space within the first chamber 150A for the isolated patient, when the lean-in glove panel interface 170A is not in use.

Figure 12B:
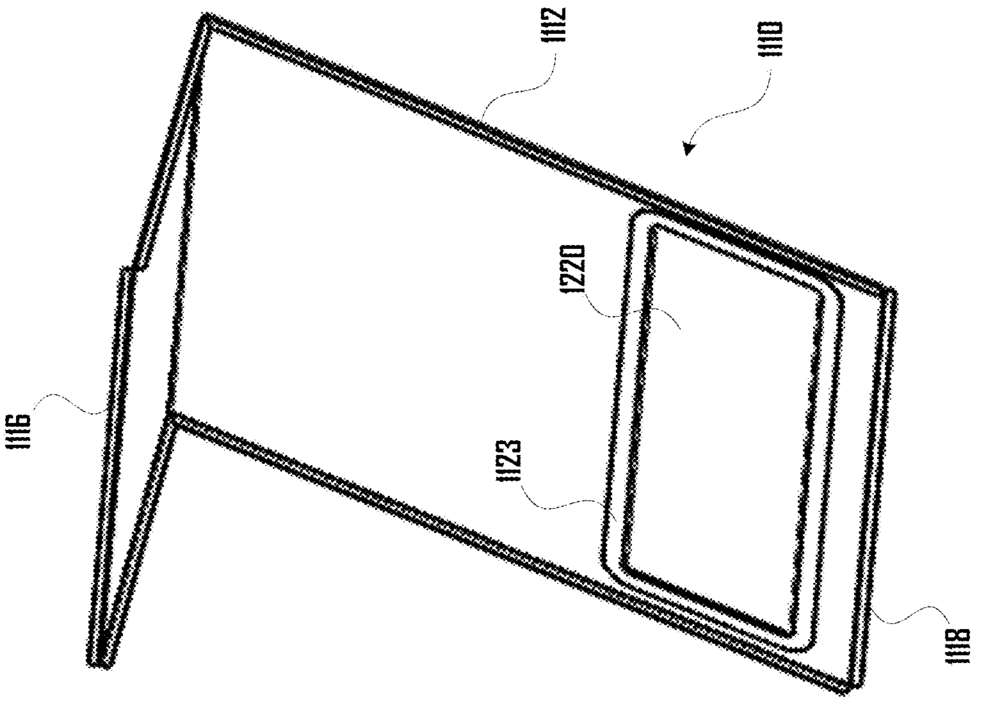
FIG. 12*b* illustrates the front panel and top panel that can be part of a lean-in glove panel interface.
Figure 12A:
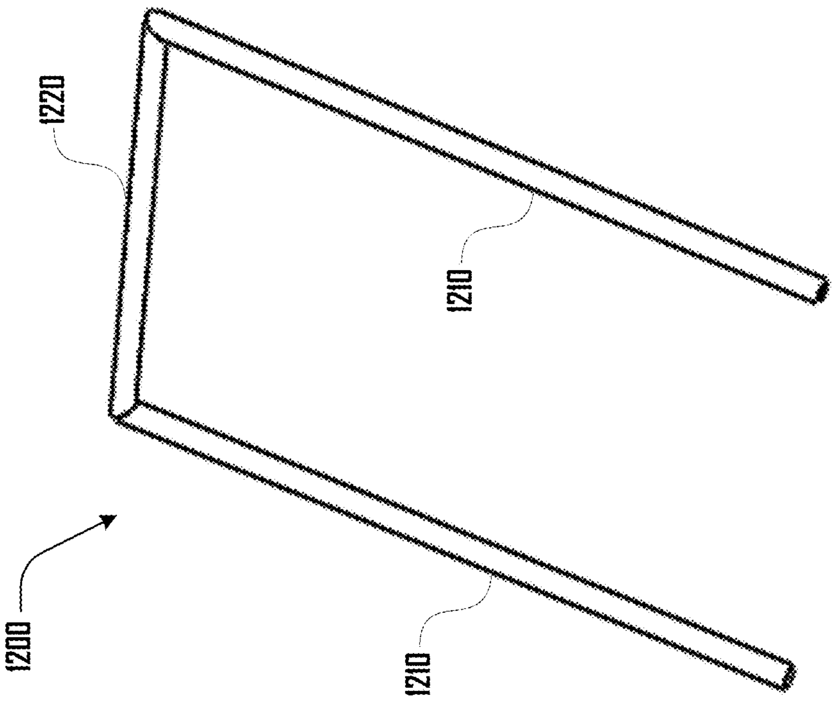
FIG. 12*a* illustrates an example of a rigid architecture having side and top bars that can surround a front panel of a lean-in interface.

A lean-in glove panel interface 170A can be configured in various suitable ways, with various portions being flexible or rigid and having various suitable shapes and sizes. For example, FIG. 12*a* illustrates an example of a rigid architecture 1200 having side and top bars 1210, 1220 that can surround a front panel 1112 that can provide support for a rigid or flexible front panel 1112 to be extended or retracted. FIG. 12*b* illustrates the front panel 1112 and top panel 1116 that can be part of a lean-in glove panel interface 170A with an interface frame 1123 and a flat panel 1228.

Figure 13:
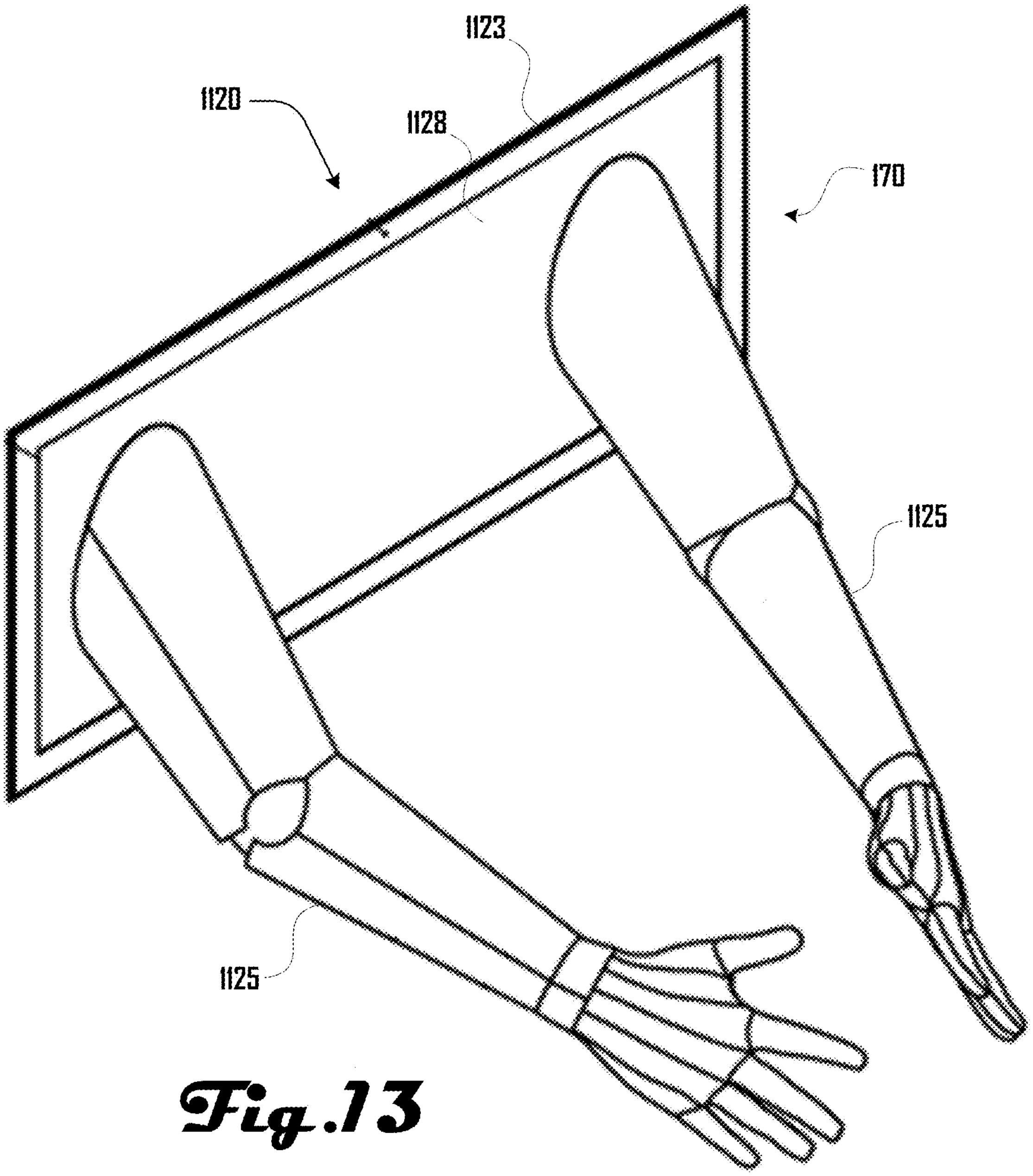
FIG. 13 illustrates and example of a glove panel interface in accordance with an embodiment.

In various embodiments, interfaces 170 or portions thereof can be modular. For example, referring to FIGS. 11-13, in some embodiments, an interface frame 1123 of a lean-in glove panel interface 170A can be configured to modularly hold a glove panel interface 1120, another type of interface 170, a flat panel 1220, or the like. Such a modular embodiment can be desirable by allowing a user to configured aspects of the isolation room system 100 based on desired capabilities, available modules, and the like. For example, where an interface 170 is not desired in a given location, a flat panel 1220, or the like, can be coupled to a given interface frame 1123, or various suitable interfaces 170 can be coupled to the interface frame 1123 as desired.

An interface frame 1123 can allow for modular components in an interface 170 such as in a lean-in glove panel interface 170A, or can allow for modularity of an interface 170 itself for example, in some embodiments, a glove panel interface 170B can be modularly coupled to an interface frame 1123 in various locations in walls 130 of an isolation room system 100 (see e.g., FIGS. 1-4 and 11). For example, in some embodiments a glove panel interface 170B can be modularly configured as a stand-alone interface 170 or can be modularly configured as a part of an interface 170 such as a lean-in glove panel interface 170A. Referring to the example of FIG. 13, the illustrated glove panel interface 1120 can be modularly configured as a stand-alone interface 170 or can be modularly configured as a part of an interface 170 such as a lean-in glove panel interface 170A.

An interface frame 1123 can be configured to modularly couple with other elements in various suitable ways including via magnetic strips, hook and loop tape, non-permanent adhesive, or the like. For example, FIGS. 23*a*, 23*b*, 23*c* and 23*d* illustrate an example of a double lap hook and loop interface that can generate a convoluted joint to help ensure minimal air leakage from the inside of the isolation room system 100 to the outside of the isolation room system 100. Specifically, a portion of an interface 170 is shown having a pair of strips of loop tape 2322 disposed on a pair of wings 2324, which can be configured to couple with a respective pair of strips of hook tape 2340 disposed on opposing faces of a wall 130. The specific example of FIGS. 23*a*, 23*b*, 23*c* and 23*d* should not be construed as limiting and various alternative configurations of such elements are within the scope and spirit of the present disclosure, such as wings 2324 being present on a wall 130, or sections of hook and loop tape 2322, 2340 being on opposite elements compared to this specific example. Also, it should be clear that such a coupling example can be applied to a rectangular frame such as an interface frame 1123, hug suit interface frame 950, pass-through frame 2070, airlock frame 1570, or the like.

In some embodiments, an interface frame 1123 can provide a permanent coupling such as with a weld, permanent adhesive, or the like. Such couplings can provide a suitable seal as discussed herein. Similarly, while some examples of an isolation room system 100 can have modular elements such as interfaces 170, in further embodiments, such elements can be an integral part of walls 130, or the like, without modularity.

Additionally, the example of a glove panel interface 170B having a pair of gloves 1125 should not be construed to be limiting on the wide variety of alternative configurations of interfaces within the scope and spirit of the present disclosure. For example, some embodiments can include an interface 170 having a single glove 1125 or any suitable plurality of gloves 1125. Additionally, another embodiment can include an interface having a pair of gloves 1125 and an elongated interface unit (e.g., similar to a glove 1125, but without fingers, such as a cylinder) which can be used in some examples can have medical devices, or the like, inserted therein to interface with an isolated patient and to be manipulated by the pair of gloves 1125. Accordingly, the material of such an elongated interface unit can be configured such that medical devices (e.g., stethoscope, thermometer, or the like) can operate through the material (e.g., TPU, PVC, butyl, nitrile, latex, and the like). In various embodiments, gloves 1125 can be layered over with sterile surgical gloves and/or the glove subcomponent 1125 can be replaced as needed.

Figure 29A:
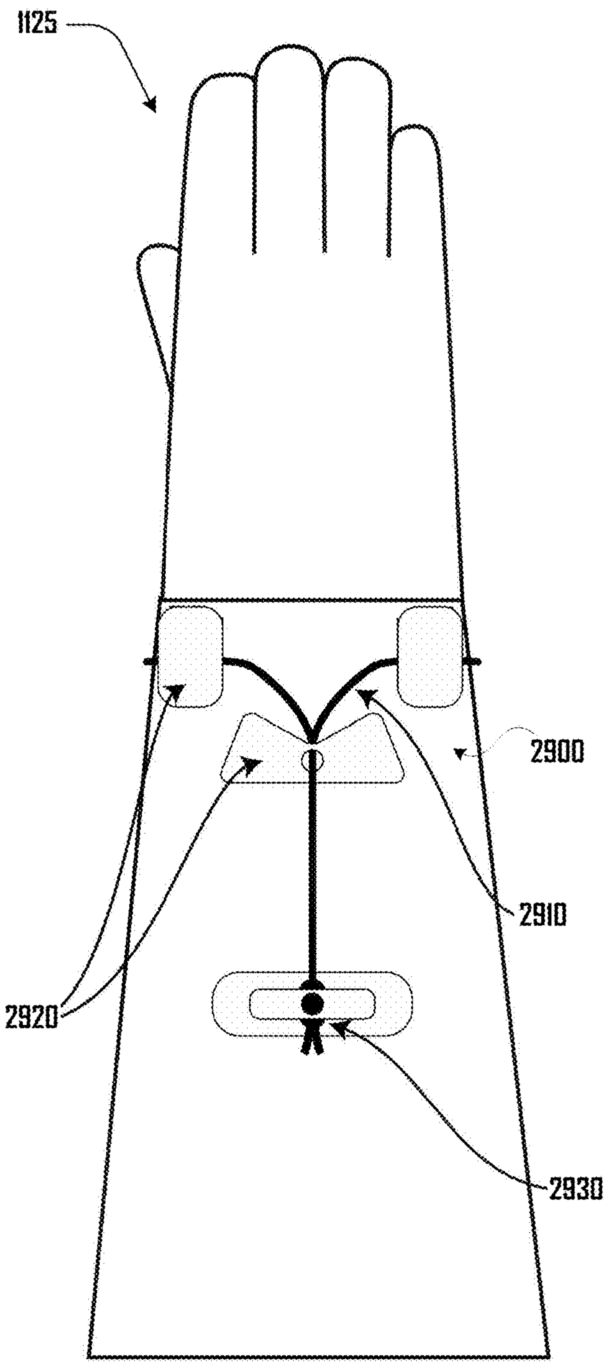
FIG. 29*a* illustrates a first side of a glove having a cinch assembly.
Figure 29B:
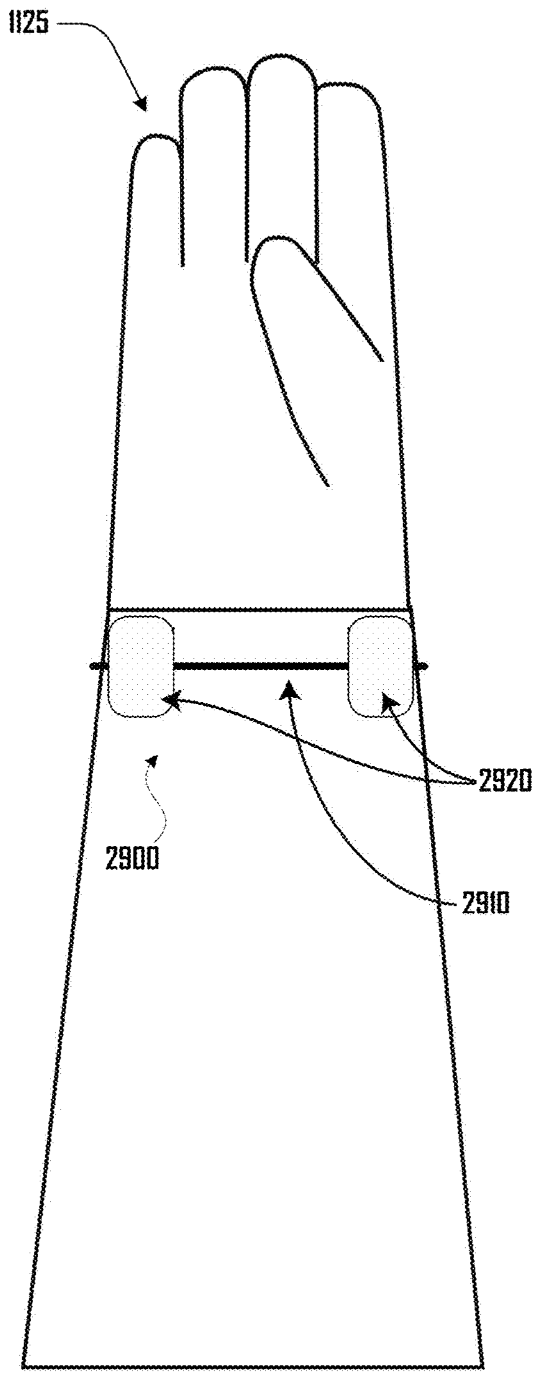
FIG. 29*b* illustrates a second side of the glove of FIG. 29*a*.
Figure 30A:
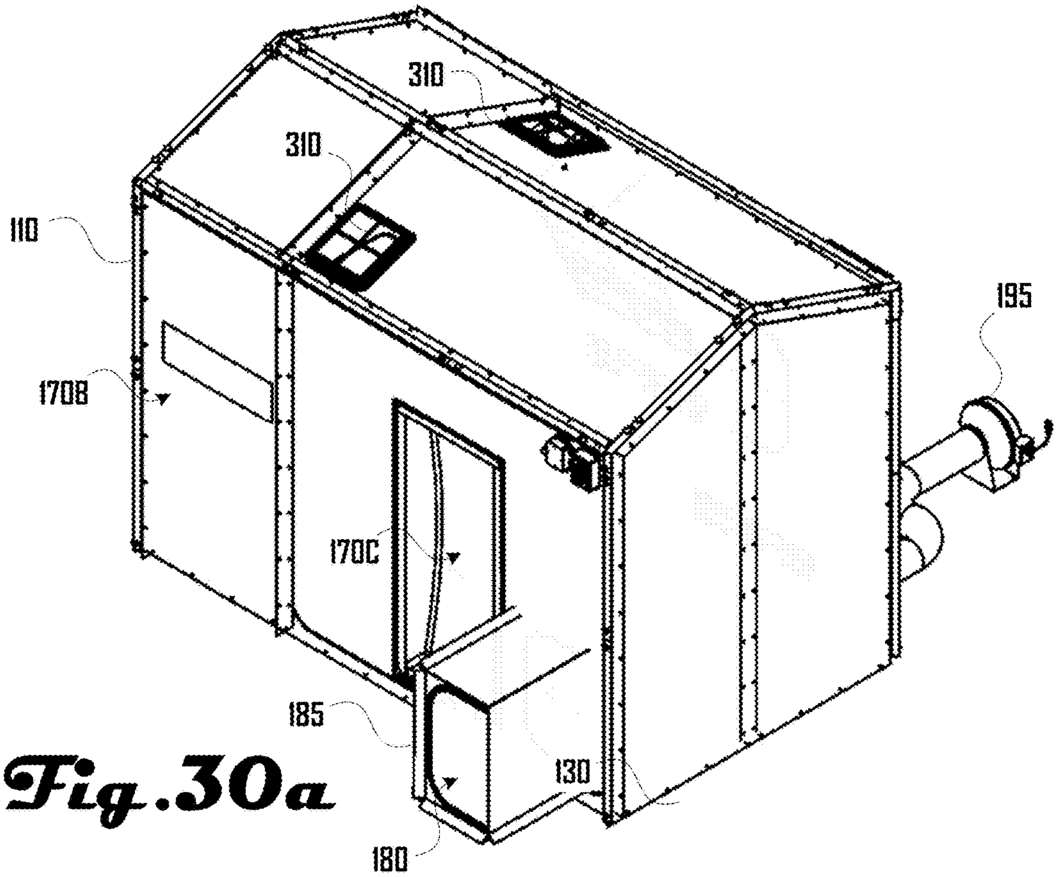
FIG. 30*a* illustrates a first perspective view of one embodiment of an isolation room system.
Figure 30B:
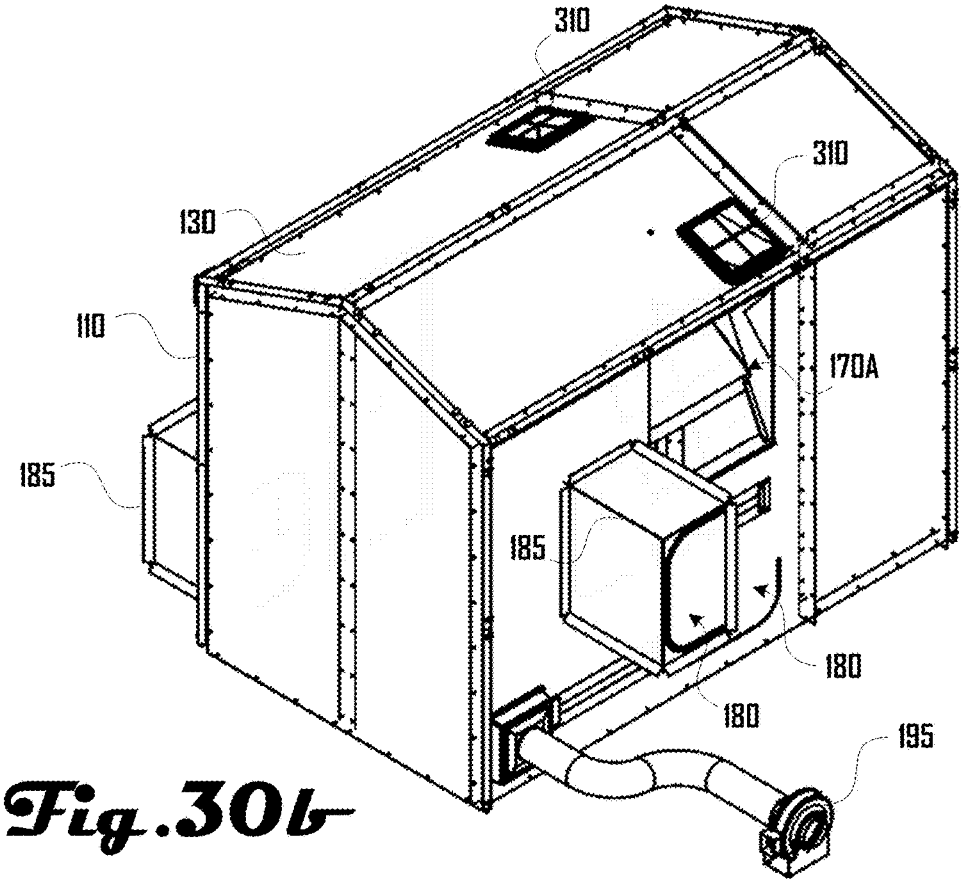
FIG. 30*b* illustrates a second perspective view of the isolation room system of FIG. 30*a*.
Figure 31A:
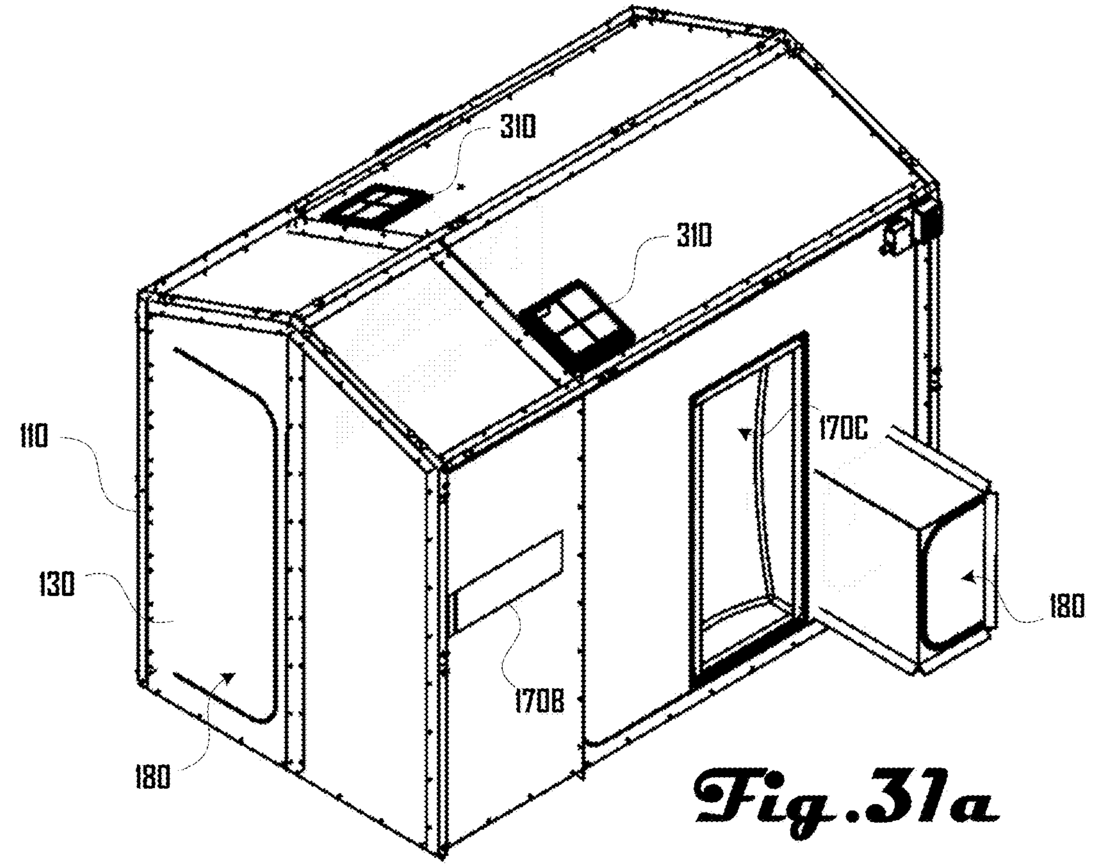
FIG. 31*a* illustrates a third perspective view of the isolation room system of FIGS. 30*a* and 30*b*.
Figure 31B:
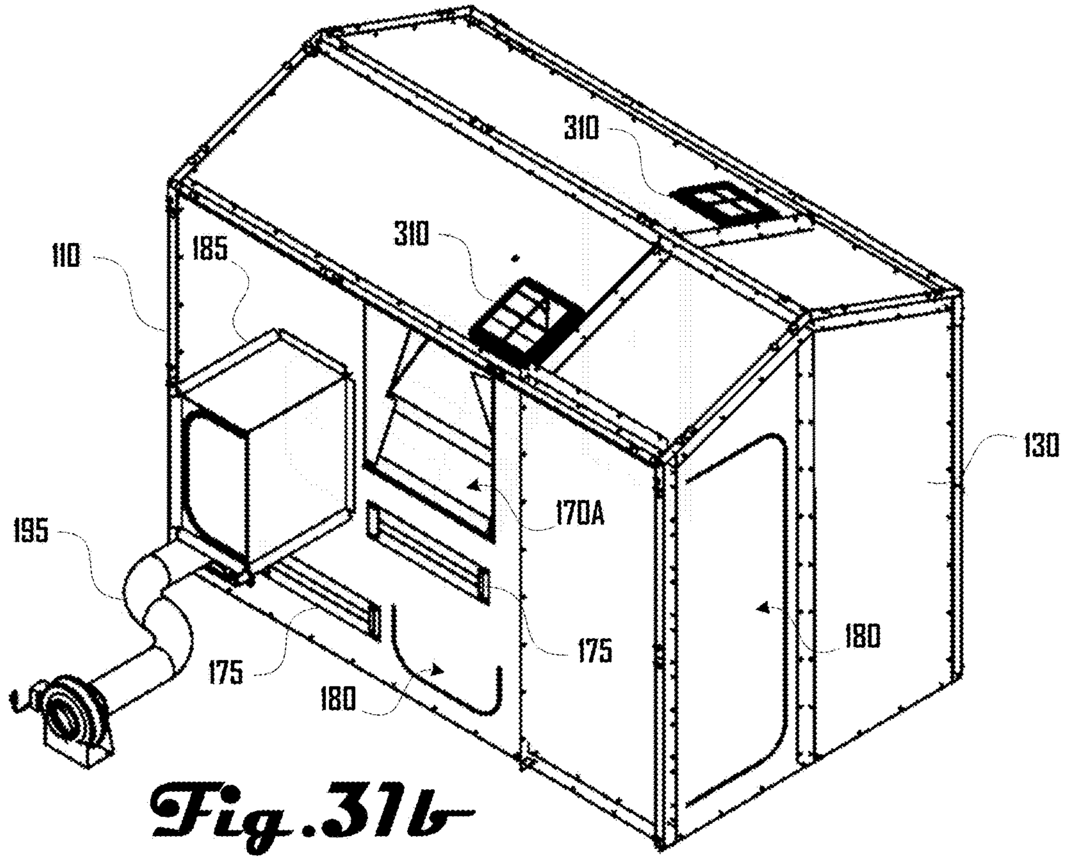
FIG. 31*b* illustrates a fourth perspective view of the isolation room system of FIGS. 30*a*, 30*b* and 31*a*.

Some embodiments of a glove 1125 can comprise a cinch assembly 2900 configured to make the glove 1125 more usable by user with larger and smaller sized hands. For example, as shown in FIGS. 29*a* and 29*b*, a cinch assembly 2900 can comprise a cord 2910 (e.g., shock cord) that is held by a plurality of retainers 2920 (e.g., tarpaulin patches). A cord lock 2930 can be configured to tighten the cord 2910 around the wrist and up towards the elbow of the user to adapt the gloves 1125 to users with smaller hands or arms.

In some embodiments, the isolation room system 100 can comprise a hug suit interface 170C as illustrated in FIGS. 3, 7-10, 24-26, 30*a* and 31*a*. For example, referring to FIGS. 7-9, a hug suit interface 170C can comprise a gown body 710 having a head portion 720, arm portions 730 and a ventilation system 740 comprising a tube that can provide and/or remove air from the head portion 720 or other portions of the gown body 710. The gown body 710 can be coupled (e.g., integrally or removably as discussed herein) to a wall 130 (e.g., sidewall 134) isolation room system 100 via a hug suit interface frame 950 as shown in FIG. 9. The hug suit interface 170C can be configured for a user 701 to enter the hug suit interface 170C and interact with a patient 702 isolated within the isolation room system 100, with the user 701 remaining external to the isolation room system 100 and safely separated from viral, bacterial or toxic elements associated with the isolated patient 702. However, the hug suit interface 170C in various embodiments can allow the user 701 to have direct interaction (e.g., hugging, physical inspection, treatments, and the like) with the isolated patient 702 via the hug suit interface 170C, which can be desirable for doctors, nurses, friends and family to safely have more direct interaction with the isolated patient 702, which can improve the wellbeing of the patient 702, improve quality and options for care, and the like.

Figure 7:
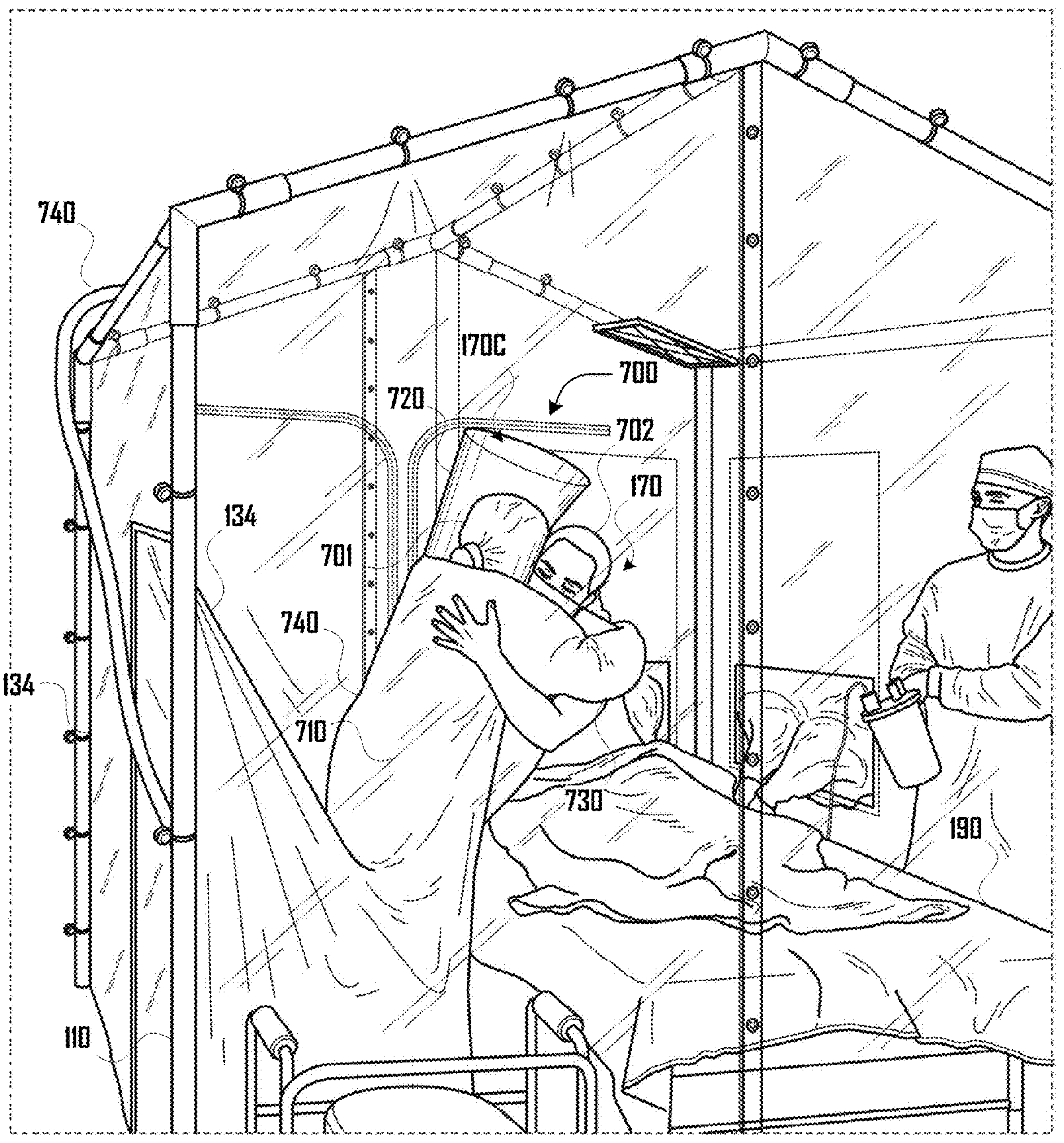
FIG. 7 illustrates an embodiment of an isolation room system that comprises a hug suit interface.
Figure 8:
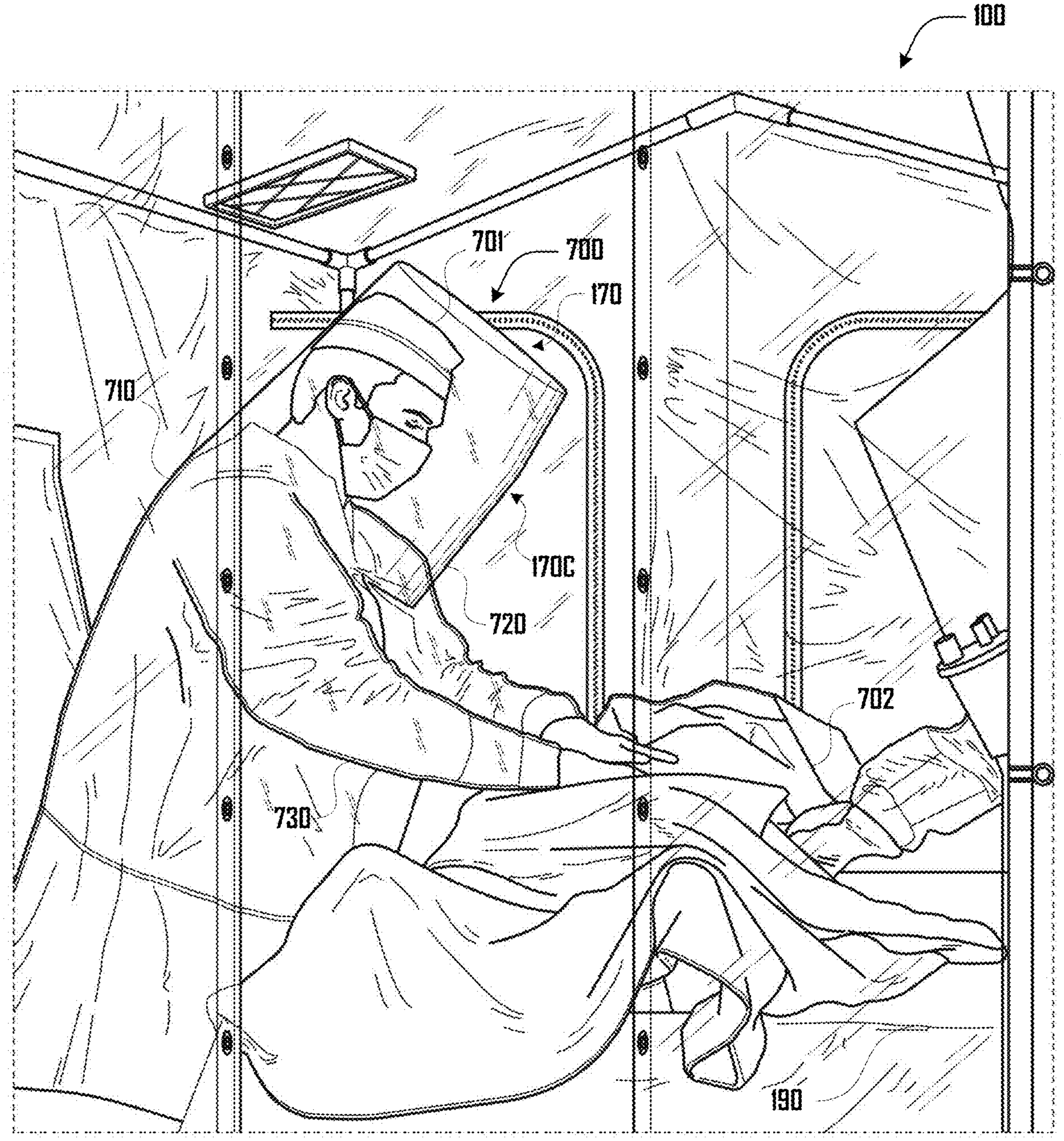
FIG. 8 illustrates another embodiment of an isolation room system that comprises a hug suit interface.
Figure 24:
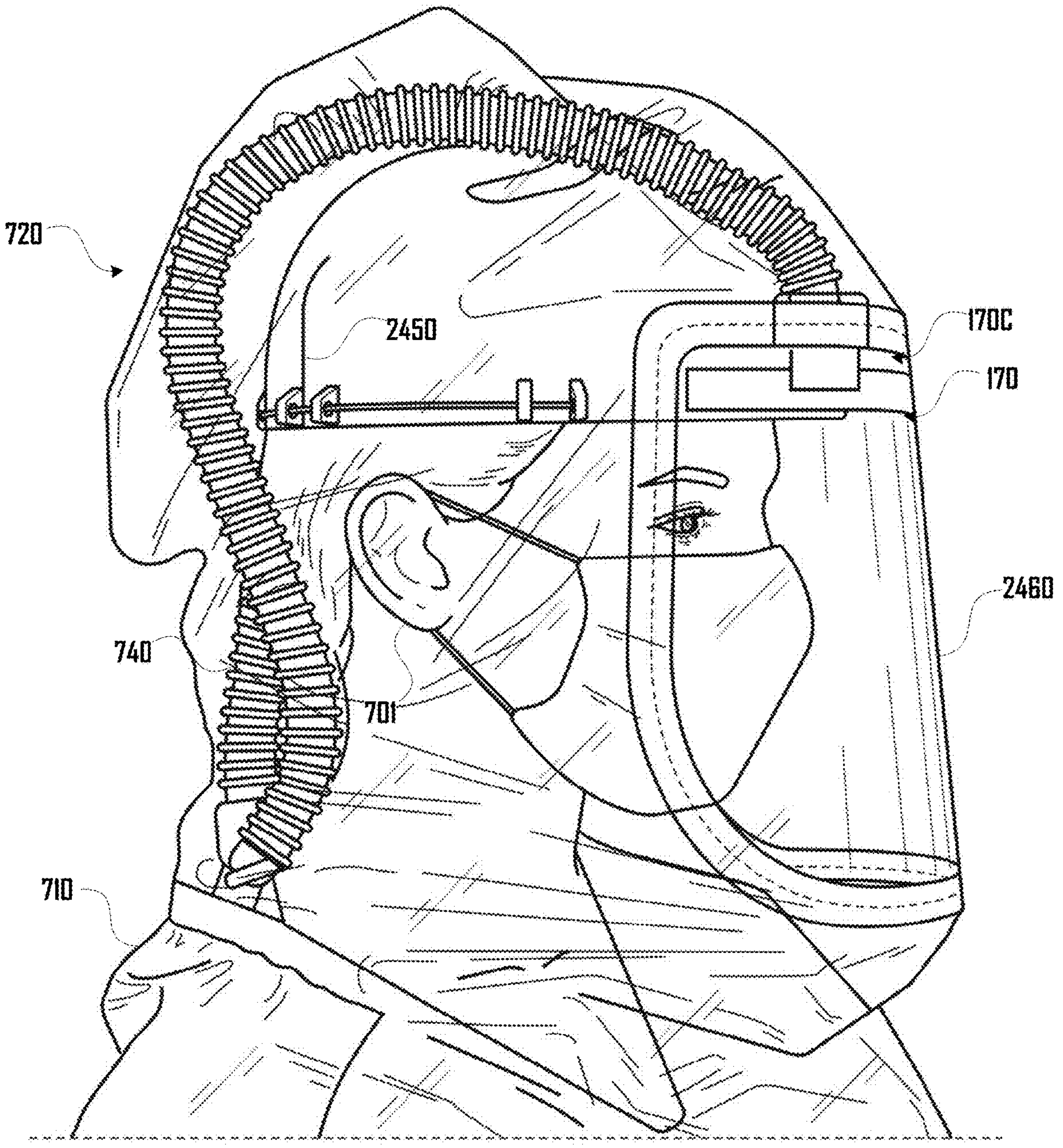
FIG. 24 illustrates and example embodiment of a head portion of a hug suit interface having a helmet assembly and face shield.
Figure 25:
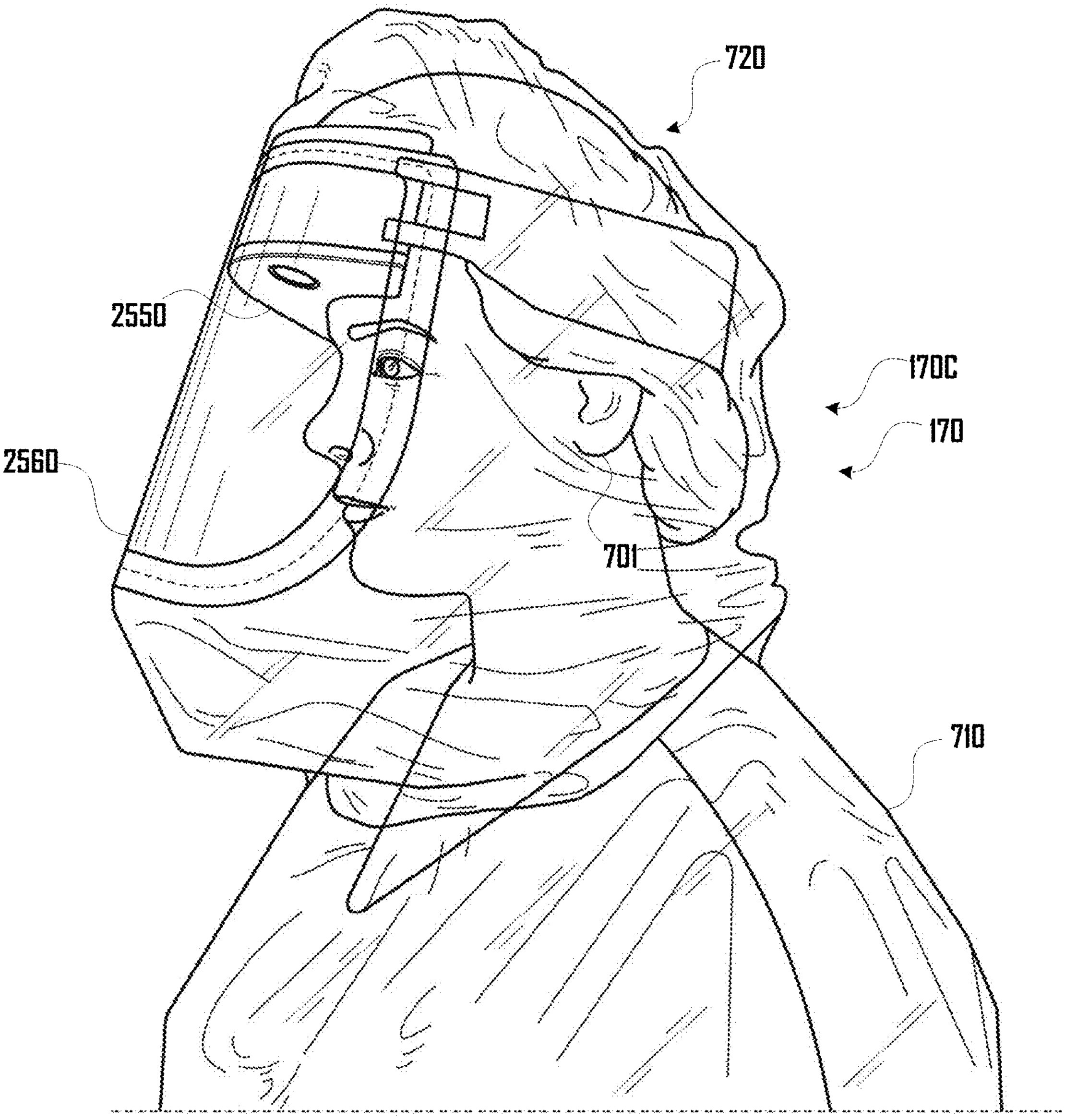
FIG. 25 illustrates another example embodiment of a head portion of a hug suit interface having a head band assembly and face shield.
Figure 26:
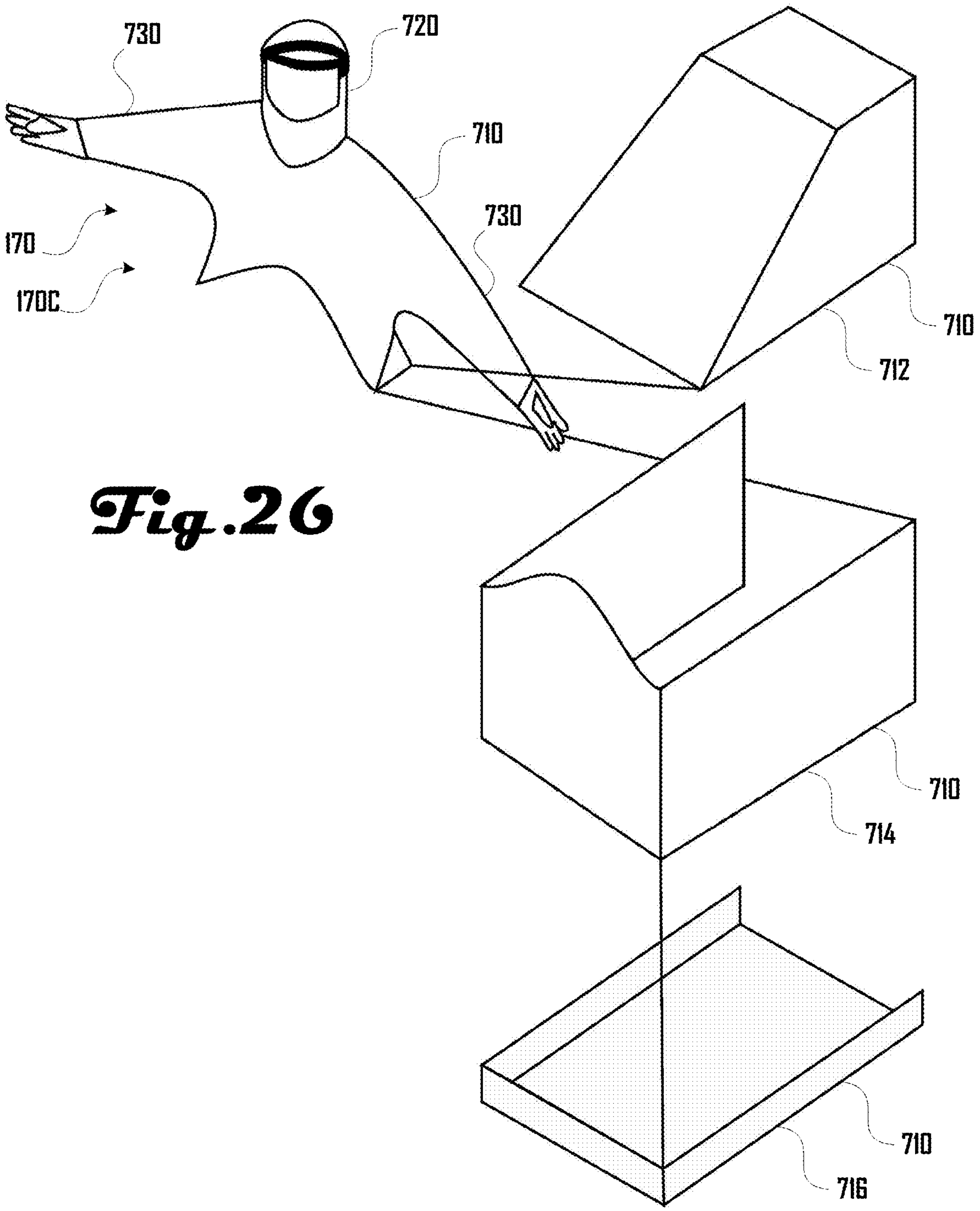
FIG. 26 illustrates an exploded view of a further embodiment of a hug suit interface.

The hug suit interface 170C can be configured in various suitable ways. For example, FIGS. 7-9 illustrate an embodiment where the head portion 720 is a cylindrical member; FIG. 24 illustrates an embodiment having a helmet assembly 2450 and a rigid face shield 2460; and FIG. 25 illustrates an embodiment having headband assembly 2550 and a rigid face shield 2560. Specifically, FIG. 24 illustrates an example of a hug suit 170C having a gown body 710 with a head portion 720 extending therefrom that includes a helmet assembly 2450 disposed therein that is coupled to a rigid face shield 2460 that defines a portion of the head portion 720. Tubes of a ventilation system 740 can be configured to run over the top of the helmet assembly 2450 and down the back of the user 701 with the ventilation system 740 configured for ventilation of the head portion 720. Some examples can comprise a powered air purifying system (PAPR) to provide the user 701 with clean fresh air. FIG. 25 illustrates an example of a hug suit 170C having a gown body 710 with a head portion 720 extending therefrom that includes a headband assembly 2550 disposed therein that is coupled to a rigid face shield 2560 that defines a portion of the head portion 720. Such embodiments can be desirable for providing structure and wearability to the head portion 720 and to provide an architecture to hold elements such as a ventilation system 740, lights, cameras, sensors, instruments, or the like. FIG. 26 is another example embodiment of a hug suit 170C that illustrates portions 712, 714, 716 that can make up a gown body 710. Specifically, a first and second portion 712, 714 along with a base portion that can be configured to extend within one or more cavities 150 of the isolation room system 100.

Figure 20:
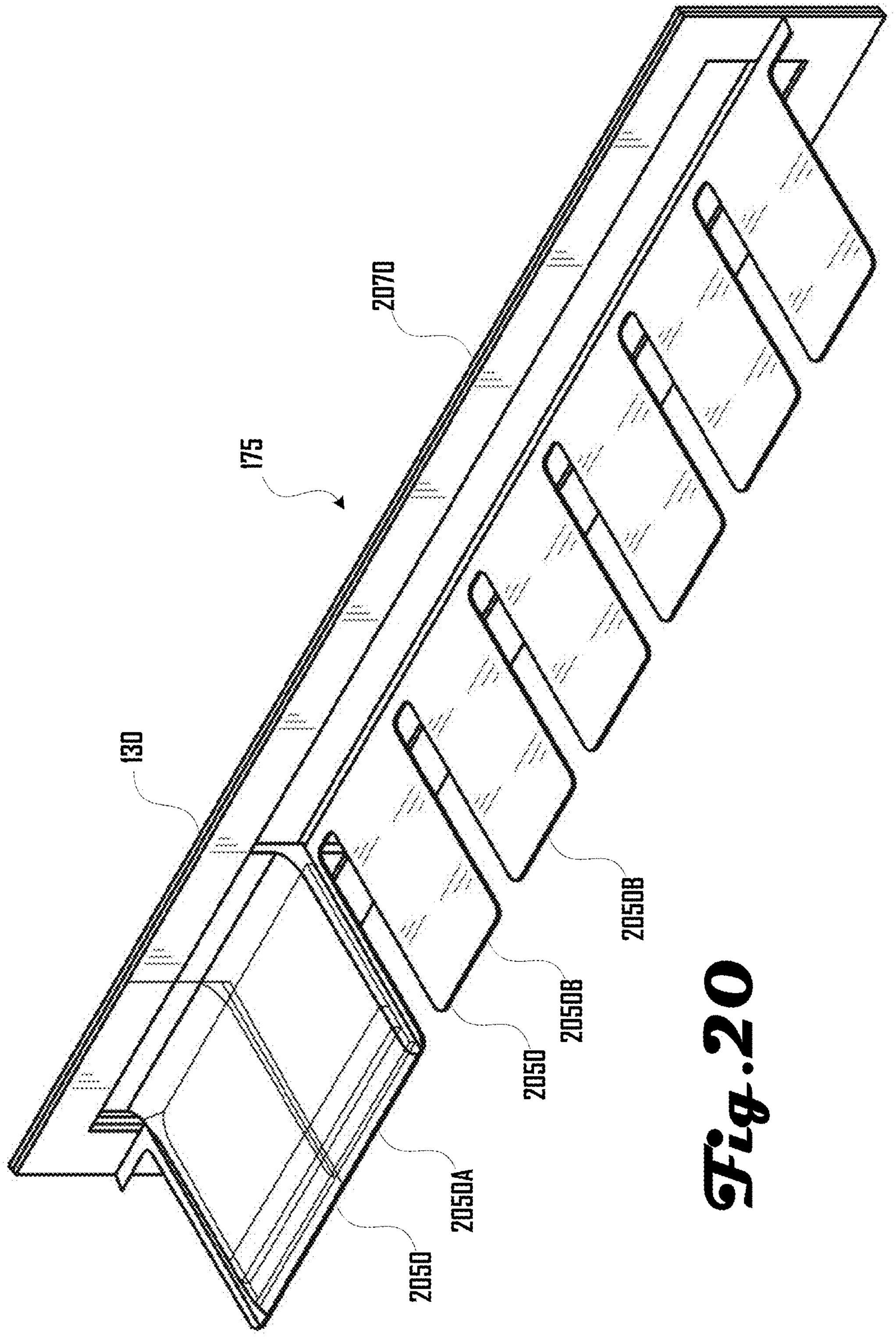
FIG. 20 illustrates and example embodiment of a pass-through interface.

Various embodiments can include one or more pass-throughs 175 that are configured to allow various elements to extend through walls 130 of an isolation room system 100 such as an IV line, ventilator tube, monitor line, oxygen line, catheter line, communication line, power line, and the like. For example, FIGS. 1, 3, 4, 11 and 17 illustrate examples of one or more pass-throughs 175 being disposed in a sidewall 134 of an isolation room system 100, with FIG. 20 illustrating the configuration of one embodiment of a pass-through 175 and FIGS. 21*a*, 21*b*, 22*a* and 22*b* illustrate one embodiment of a pass-through unit 2050. Further embodiments can include one or more pass-throughs 175 in various suitable locations, with various suitable orientations, and with various suitable configurations, so the present examples of pass-throughs 175 should not be construed to be limiting.

Turning to FIG. 20, an example of a pass-through 175 is illustrated having a linear array of pass-through units 2050. Specifically, the pass-through 175 is shown having a one first pass-through unit 2050A and six second pass-through units 2050B. In various embodiments, the pass-through 175 can be coupled to a wall 130 of an isolation room system 100 via a pass-through frame 2070, with the array of pass-through units 2050 extending from the wall 130 on the outside of the isolation room system 100, which can make it possible for a user (e.g., doctor, nurse, or the like) to manipulate the pass-through units 2050 and insert and/or remove elements from the pass-through 175 as discussed in more detail herein. In some examples, the pass-through 175 can be integrally coupled to a wall 130 or modular via pass-through frame 2070, which in some embodiments can allow different pass-throughs 175 to be coupled to the wall 130 via the pass-through frame 2070, a flat plate to be coupled to the wall 130 via the pass-through frame 2070, and the like.

Turning to FIGS. 21*a*, 21*b*, 22*a* and 22*b*, another embodiment of a pass-through unit 2050C is illustrated that includes a pass-through sheets 2121, a coupling cover 2122, and a coupler 2124 that define a pass-through slot 2126, which in this example, is shown allowing a tube 2128 to be inserted through the pass-through unit 2050 and extending between the outside and inside of a wall 130 of the isolation room system 100.

Figure 21A:
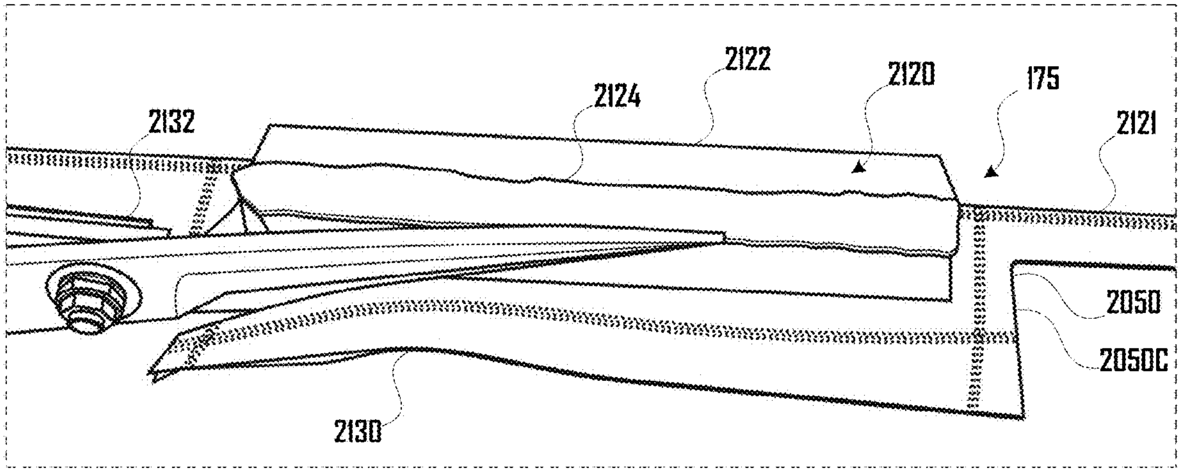
FIG. 21*a* illustrates an example of a through unit with a tip being removed via scissors to expose a pass-through slot defined at least in part by opposing sheets of the pass-through unit.
Figure 21B:
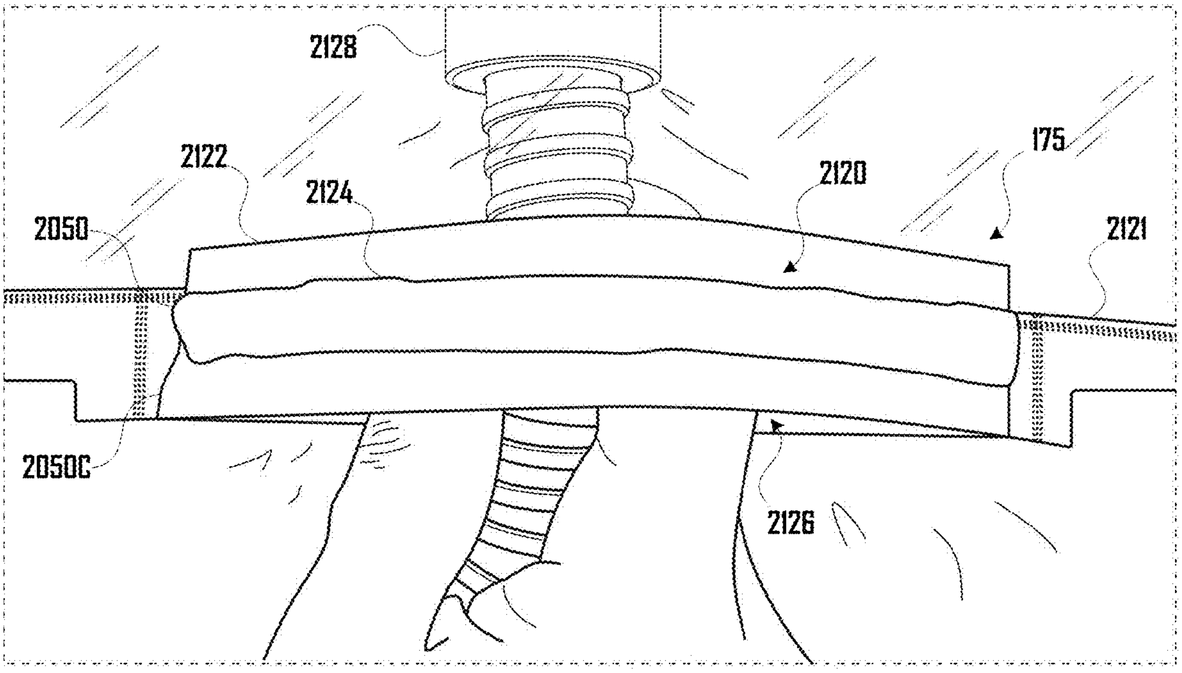
FIG. 21*b* illustrates a tube inserted through the pass-through slot of FIG. 21*a*.

As shown in the example of FIG. 21*a*, in some embodiments a pass-through unit 2050 can initially be sealed (e.g., via a weld, or the like), and a tip 2130 of the pass-through unit 2050 can be removed (e.g., via scissors 2132), to expose the pass-through slot 2126 defined at least in part by opposing sheets 2121 of the pass-through unit 2050. As shown in FIG. 21*b*, a tube 2128 (e.g., a ventilator tube) can be inserted through the pass-through slot 2126 (e.g., from the outside of the isolation room system 100 into one of the chambers 150).

Figure 22A:
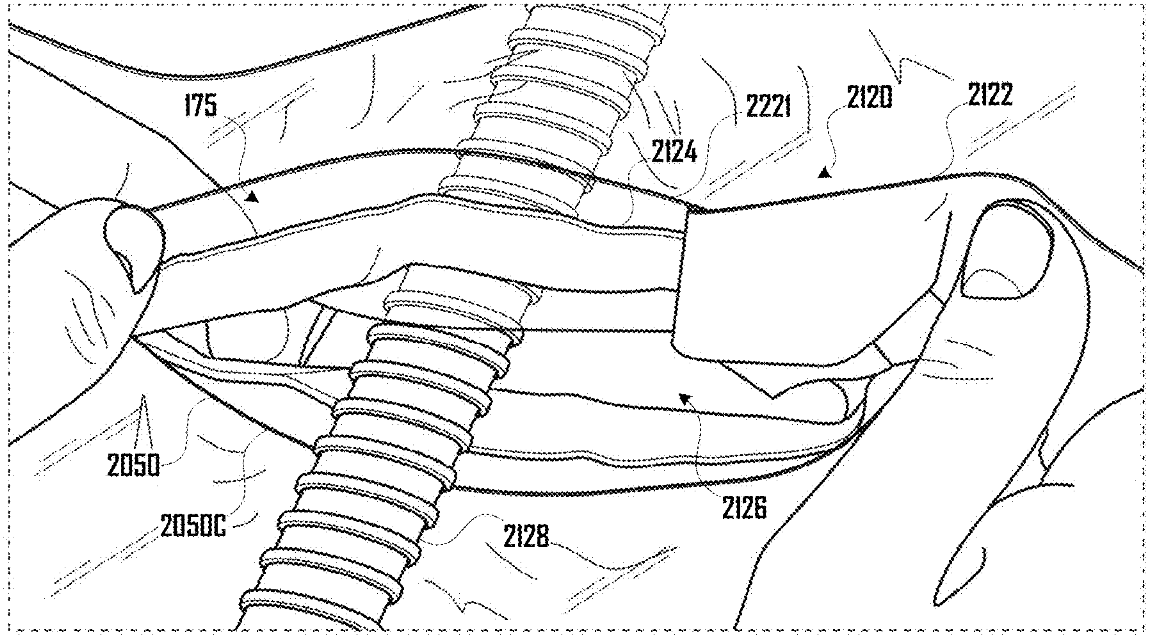
FIG. 22*a* illustrates a coupling cover being removed from a coupler.
Figure 22B:
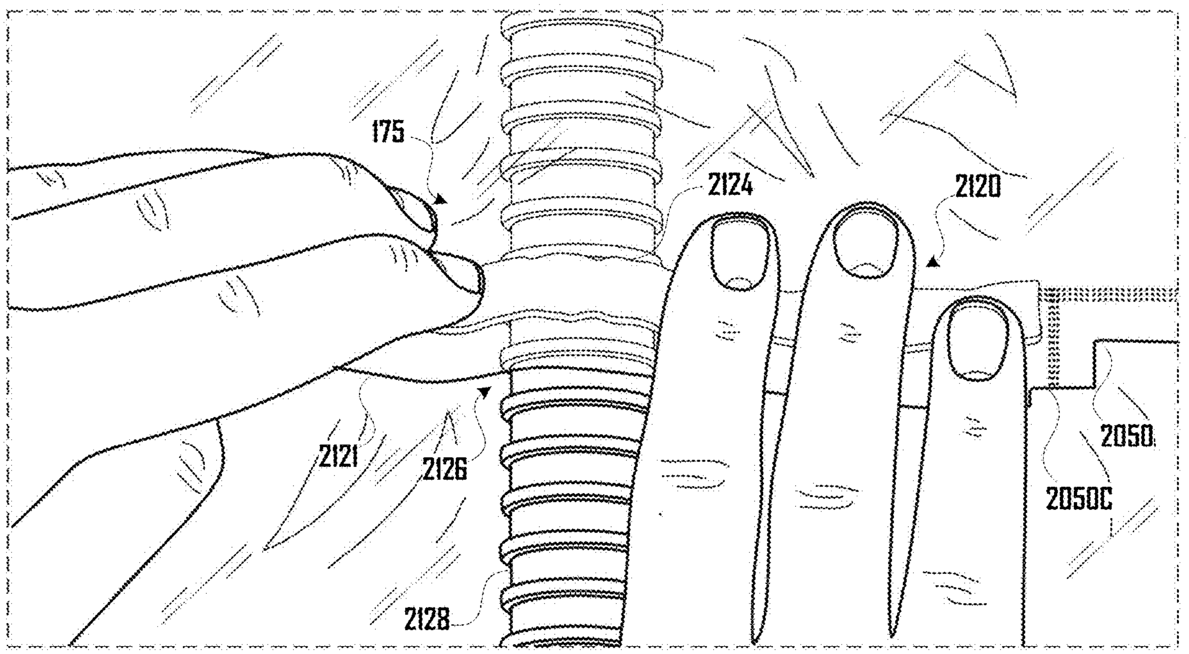
FIG. 22*b* illustrates opposing faces of the coupler being coupled together on opposing sides of the tube to generate a seal around the tube.
Figure 23A:
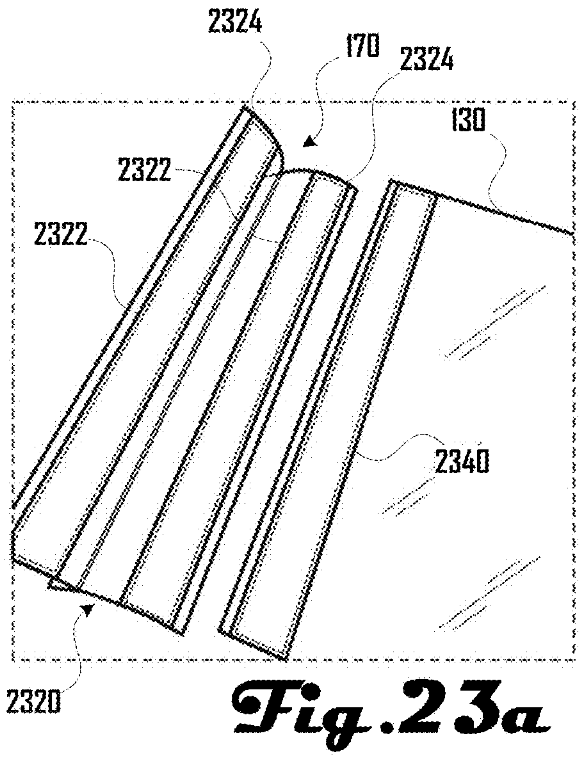
FIGS. 23*a*, 23*b*, 23*c* and 23*d* illustrate an example of a double lap hook and loop interface that can generate a convoluted joint to help ensure minimal air leakage from the inside of the isolation room system to the outside of the isolation room system.
Figure 23B:
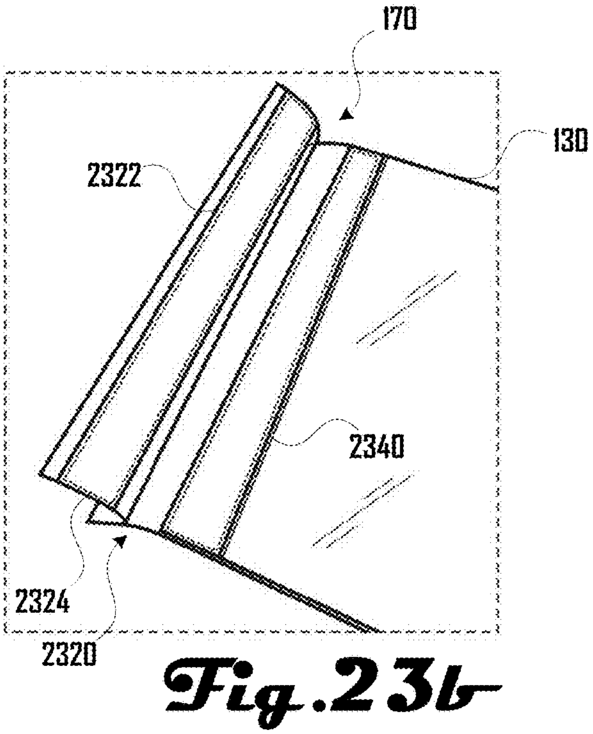
Figure 23C:
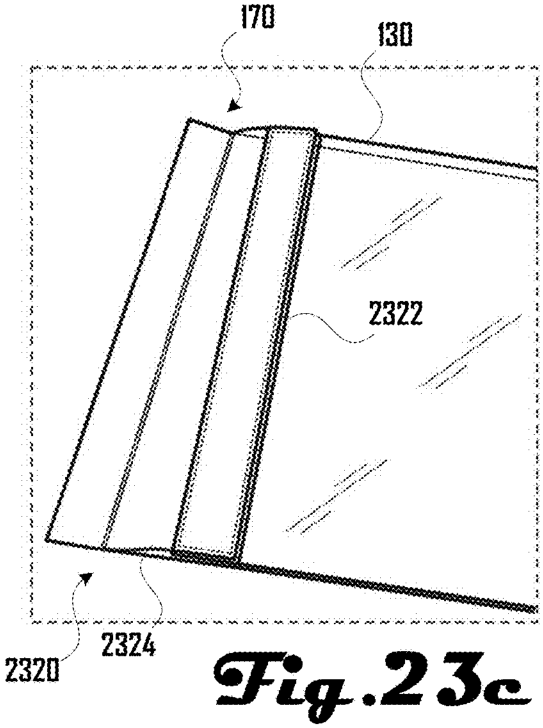
Figure 23D:
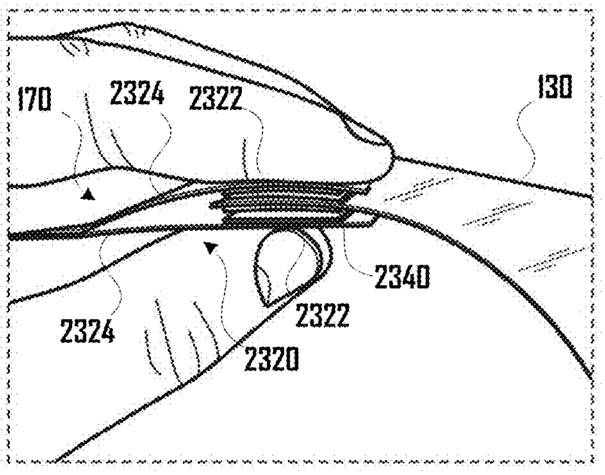

To generate a seal around the tube 2128 so that the outside and inside of the isolation room system 100 can remain separate, the coupling cover can be removed from the coupler 2124 as shown in FIG. 22*a*, which can allow opposing faces of the coupler 2124 to be coupled together on opposing sides of the tube 2128 to generate a seal around the tube 2128 as shown in FIG. 22*b*. Such a seal can be complete, substantially complete, or sufficiently complete such that any gaps do not allow air to escape from the isolation room system 100 based on a negative pressure within the isolation room system 100. In some embodiments, the coupler 2124, can comprise an adhesive material.

Pass-through units 2050 can be configured in various suitable ways, so the example of FIGS. 21*a*, 21*b*, 22*a* and 22*b* should not be construed as being limiting. For example, further embodiments can include various suitable couplers, such as hook and loop tape, magnetic strips, a zip tie, hose clamp, or the like. Additionally, some embodiments of pass-through units 2050 may not include a sealed tip 2130 or may include a re-sealable tip that does not need to be cut to expose the pass-through slot 2126 (see e.g., FIGS. 21*b* and 22*a*). Similarly, a pass-through 175 can have any suitable number of one or more pass-through units 2050 with a plurality of pass-through units 2050 being the same or different in some embodiments. For example, FIG. 20 illustrate the first pass-through unit 2050A configured with a larger slot 2126 (see e.g., FIGS. 21*b* and 22*a*) than the second pass-through units 2050B, which can be desirable for allowing a larger sized element (e.g., a ventilation tube) to be introduced into the isolation room system 100 via the first pass-through unit 2050A and smaller sized elements (e.g., IV tubes) can be introduced into the isolation room system 100 via the second pass-through units 2050B.

Various embodiments can include one or more airlocks 185 configured for items to be introduced into and/or removed from the isolation room system 100. For example, FIGS. 1-4, 15, 31 and 32 show various examples of isolation room systems 100 having one or more airlocks 185 that comprise an enclosure 187 that defines an airlock cavity 155, with a pair of doors 180 that respectively provide access to the airlock cavity 155 via the outside and inside of the isolation room system 100.

In some examples, airlocks can extend internally, externally, and/or both internally and externally. For example, FIG. 2 illustrates an embodiment having a first and second airlock 185A, 185B that extend externally and a third airlock 185C that extends internally. More specifically, the enclosures 187 of the externally-extending airlocks 185A, 185B are disposed on the outside of the isolation room system 100 with one door 180 on an external portion of the enclosure 187 and another door 180 in a wall 130 that opens from the first chamber 150A to the respective cavities 155A, 155B. In contrast, the enclosure 187 of the internally-extending airlock 185 is disposed on the inside of the isolation room system 100 in the first chamber 150A, with one door 180 on an internal portion of the enclosure 187 and another door 180 in a wall 130 that opens from the cavity 155A, 155B to the outside of the isolation room system 100.

Figure 27:
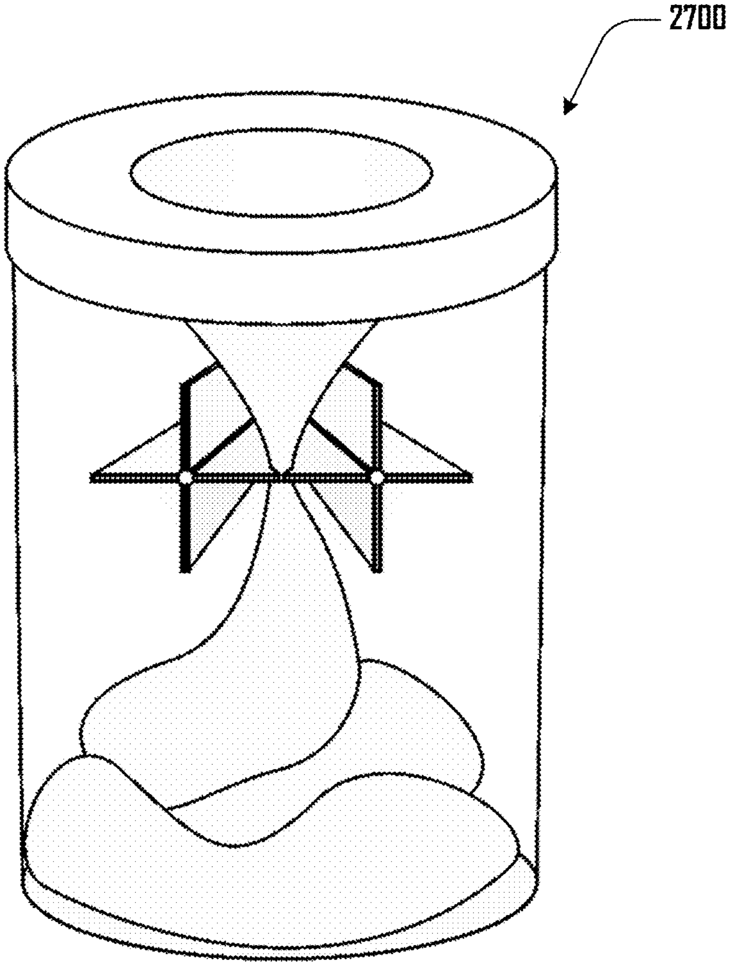
FIG. 27 illustrates an example of a waste bucket in accordance with one embodiment.

Airlocks 185 can be disposed in various suitable locations on an isolation room system 100 (e.g., opening to the first, second or third chambers 150A, 150B, 150C, or the like) for various purposes. For example, referring to the example of FIG. 2, the first airlock 185 can be disposed proximate to the toilet 290 and can be used for the removal of human waste from the isolation room system 100. For example, human waste generated by the isolated patient can contained in a waste bucket 2700 (See FIG. 27) within the first chamber 150A. Each day, a used waste bucket 2700 can be cycled out of the first chamber 150A, but can remain in the first airlock 185A for a quarantine period (e.g., 24 hours) before being decontaminated, removed, and cleaned. A new waste bucket 2700 can be cycled into the first chamber 150A via the first airlock 185A prior to the used contaminated waste bucket 2700 being inserted into the first airlock 185A for quarantine and removal.

In some embodiments, one or more airlocks 185 can be disposed on a wall 130 of an isolation room system 100 proximate to the ground that the isolation room system 100 is disposed on such that items being inserted and removed from such one or more airlocks 185 can be supported by the ground. However, in some embodiments, one or more airlocks 185 can be disposed on a wall 130 of an isolation room system 100 suspended above the ground that the isolation room system 100 is disposed on. In various examples, such a suspended airlock 185 may need to be supported via elements such as one or more legs, suspenders, or the like.

Figure 15C:
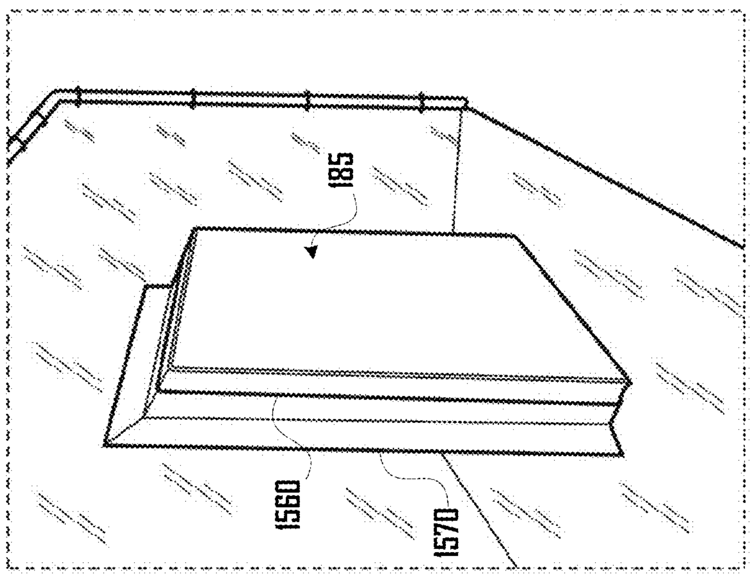
FIG. 15*c* illustrates an example of the airlock of FIG. 15*b* collapsed and enclosed within the case.
Figure 15B:
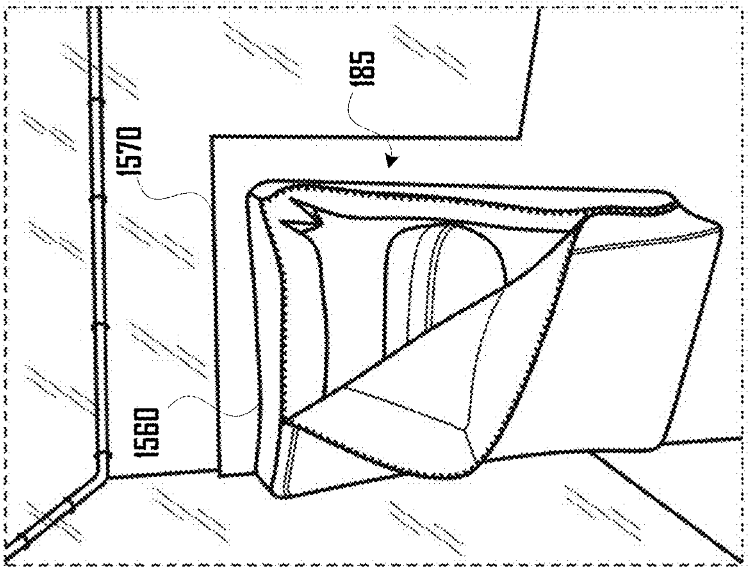
FIG. 15*b* illustrates an example of an airlock being collapsed and enclosed within a case.
Figure 15A:
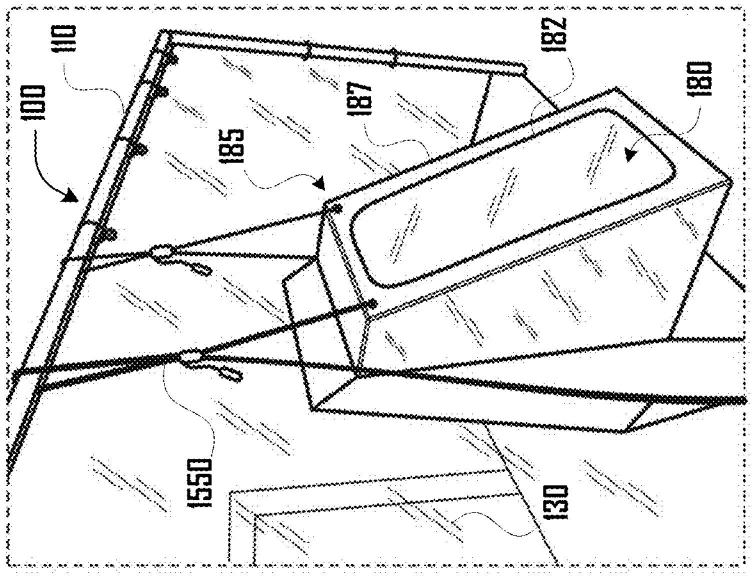
FIG. 15*a* illustrates an example of an airlock suspended above the ground via a suspender system.

For example, FIG. 15*a* illustrates an example of an airlock 185 suspended above the ground via a suspender system 1550. In various embodiments, some portions of the enclosure 187 of the airlock 185 can be rigid, such as a base, top portion, or the like, which can further provide for suspension above the ground. Additionally, in some embodiments, an airlock 185 can be collapsible. For example, FIGS. 15*b* and 15*c* illustrate an example of an airlock 185 that can be collapsed and enclosed within a case 1560, which can be desirable for storage during transport of the isolation room system 100, to store the airlock 185 when not in use, or the like. Additionally, in various embodiments, an airlock 185 can be modular as discussed herein via an airlock frame 1570, which can allow different airlocks to be coupled with the isolation room system 100 or a flat panel to be coupled in place of an airlock 185. Also, airlocks 185 can have any suitable size or shape, and the examples herein should not be construed as being limiting on the wide variety of morphologies of airlocks that are within the scope and spirit of the present disclosure.

Figure 16:
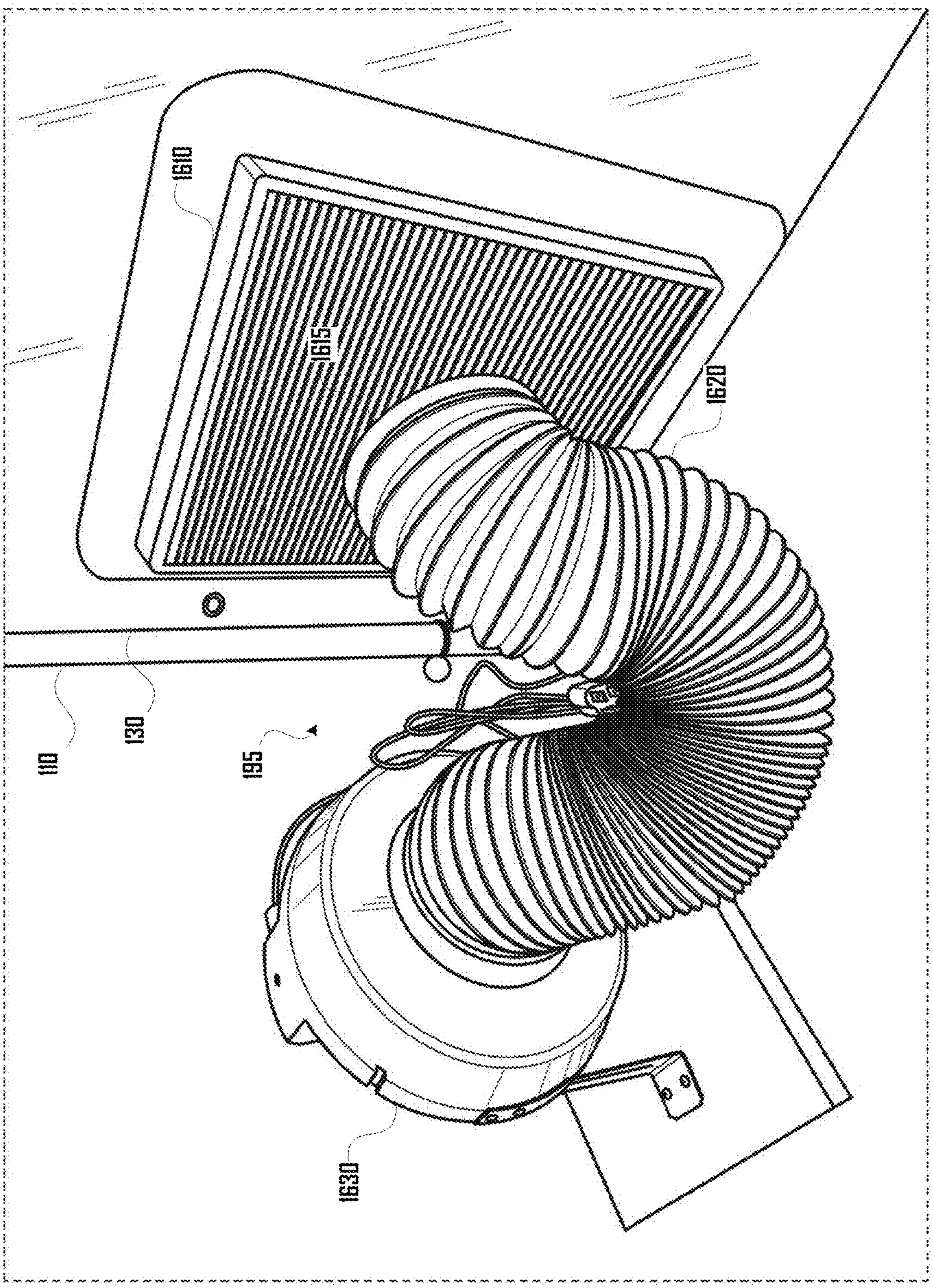
FIG. 16 illustrates an embodiment of a filtration system that comprises a filter disposed within a wall, with a duct extending from an opening in a wall of an isolation room system.
Figure 17:
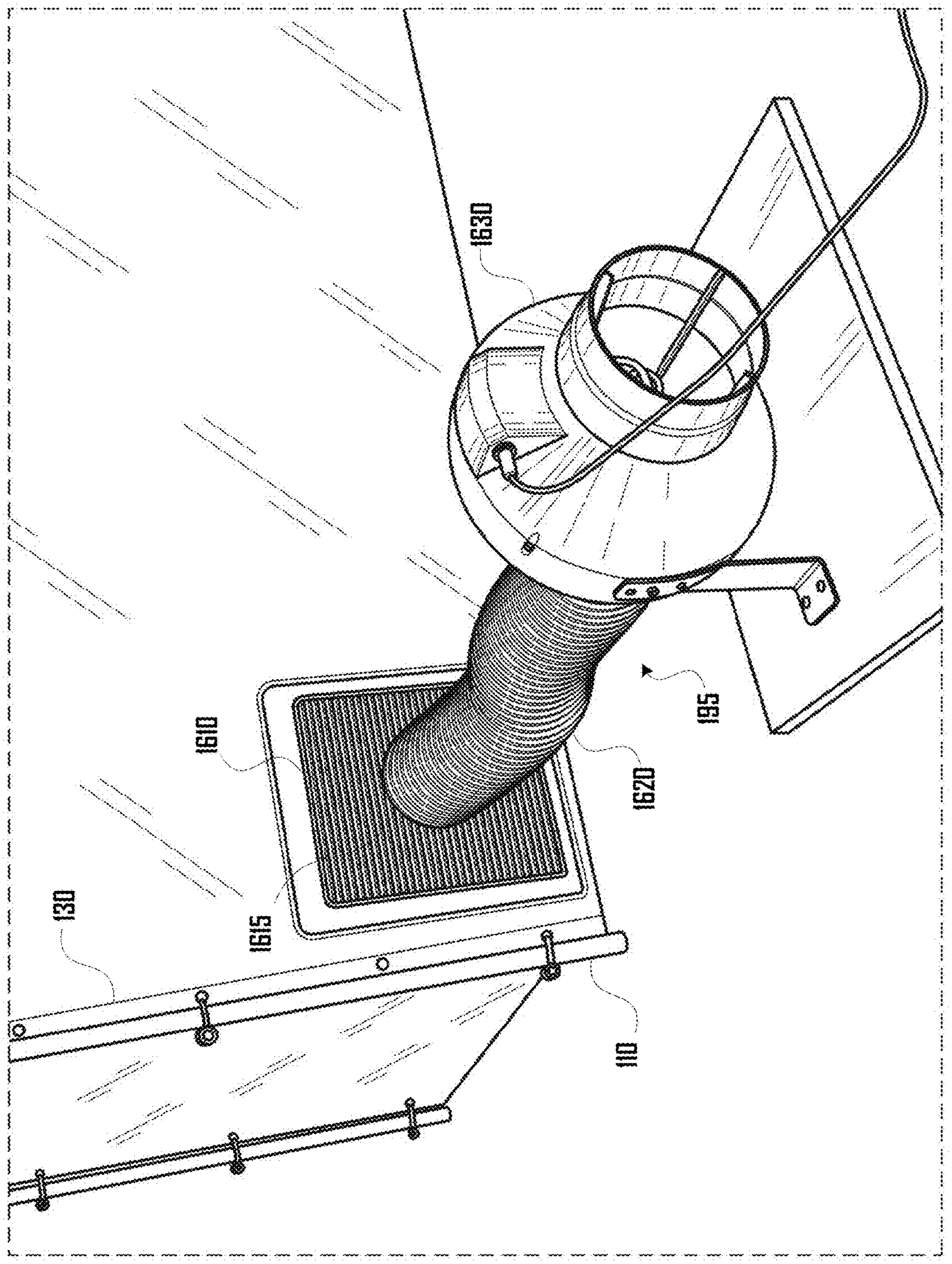
FIG. 17 illustrates another embodiment of a filtration system that comprises a filter disposed within a wall, with a duct extending from an opening in a wall of an isolation room system.

In various embodiments, the isolation room system 100 can comprise an air filtration system 195. For example, FIGS. 1-4, 16, 17, 30*a*, 30*b*, 31*a* and 31*b* illustrate examples having an air filtration system 195, with FIGS. 16 and 17 illustrating an embodiment that comprises a filter 1610 disposed within a wall 130, with a duct 1620 extending from an opening 1615 in the wall 130. The duct 1620 can extend to a fan 1630 that can generate a negative pressure within the duct 1620, which can in turn pull air from within the isolation room system 100 through the filter 1610, which can purify, sanitize or disinfect the air such that the air being pulled into the duct 1620 and blown out the fan 1630 is free of viral, bacterial and/or toxic elements that may be associated with the isolated patient within the isolation room system 100.

In various examples, such a configuration can be desirable to ensure that during and after use of the isolation room system 100, no viral, bacterial and/or toxic elements are expelled during the removal of the air ducting 1620. In one embodiment, such a filtration system 195 can comprise a sedimentation filter. Such a filter 1610 can comprise in some examples as two thin films joined together to create a network of chambers that allows particulates to settle out of the air before the air moves outside the isolation room system 100.

Figure 18:
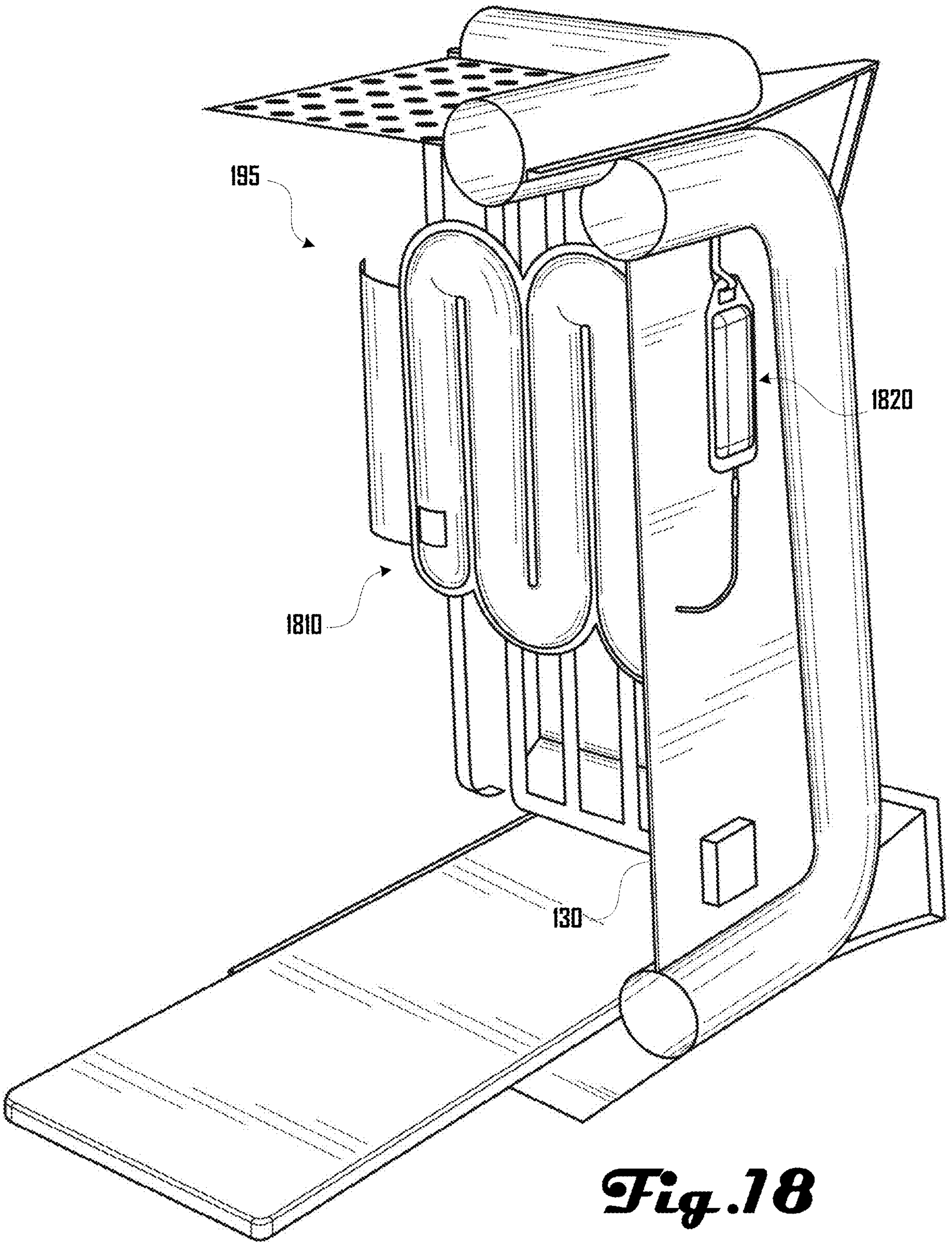
FIG. 18 illustrates a further embodiment of a filtrations system.
Figure 19:
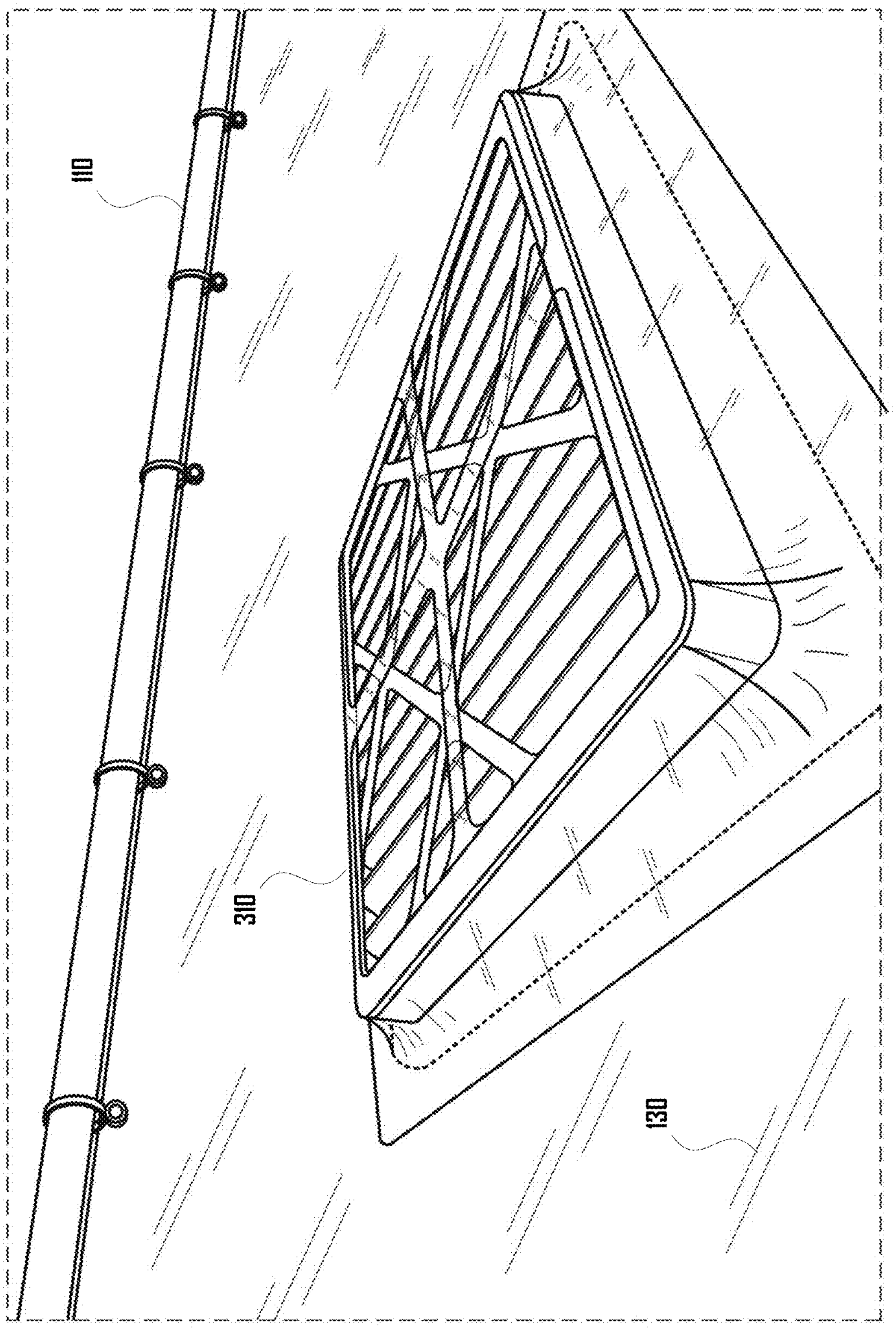
FIG. 19 illustrates an example embodiment of an intake filter.

In another embodiment, the filtration system 195 can comprise a high efficiency particulate air (HEPA) filter potted into a rigid or semi-rigid housing that can be joined to a wall 130. Such a HEPA filter can have various suitable MERV Ratings for average particle size efficiency such as: MERV 1-4: 3.0-10.0 microns less than 20%; MERV 6: 3.0-10.0 microns <49.9%; MERV 8: 3.0-10.0 microns <84.9%; MERV 10: 1.0-3.0 microns 50%-64.9%, 3.0-10.0 micron 85% or greater; MERV 12: 1.0-3.0 micron 80%-89.9%, 3.0-10.0 micron 90% or greater; MERV 14: 0.3-1.0 microns 75%-84%, 1.0-3.0 microns 90% or greater; MERV16: 0.3-1.0 microns 75% or greater. Some embodiments can include filtering of the air for volatile anesthetics, heated anti-viral filters, gravity filter (see, e.g., gravity filter 1810 of FIG. 18) and the like. Various embodiments can include active and/or passive filtering systems.

The air filtration system 195 can be configured to meet or exceed a 15 air-exchanges-per-hour (ACH) CDC guidelines for surgical procedure and delivery rooms. Some embodiments can be configured to meet or exceed 5, 10, 15, 20, 25, 30 air-exchanges-per-hour (e.g., the volume of the first chamber 150A can be exchanged such a number of times per hour). In some embodiments the first chamber 150A can be about 390 cubic feet and is some embodiments the first chamber can be about 560 cubic feet or can be 200 cubic feet. In some examples, the first chamber can be 400-380 cubic feet, 410-370 cubic feet, 420-360 cubic feet, 430-350 cubic feet, 440-340 cubic feet, 600-520 cubic feet, 180-220 cubic feet, 190-201 cubic feet, and the like.

Additionally, various embodiments can comprise one or more intake filters 310 that can allow for air intake into the isolation room system 100. For example, FIGS. 3, 4, 6, 11, 19, 30*a*, 30*b*, 31*a* and 31*b* illustrate example embodiments having one or more intake filters 310 disposed on one or more roof walls 136 of the isolation room system 100. Further embodiments can include any suitable number of intake filters 310 in any suitable location(s) or intake filters 310 can be absent in some examples.

Further embodiments of an isolation room system 100 can be configured in various suitable ways, so the specific embodiments discussed herein should not be construed as limiting on the wide variety of additional configurations that are within the scope and spirit of the present disclosure. For example, while some embodiments can be approximately 10'×10'×7' and configured fit into most single-patient hospital rooms and so multiple units can be setup in larger spaces, further embodiments can be simpler, more complex, larger, smaller, or the like.

Figure 28:
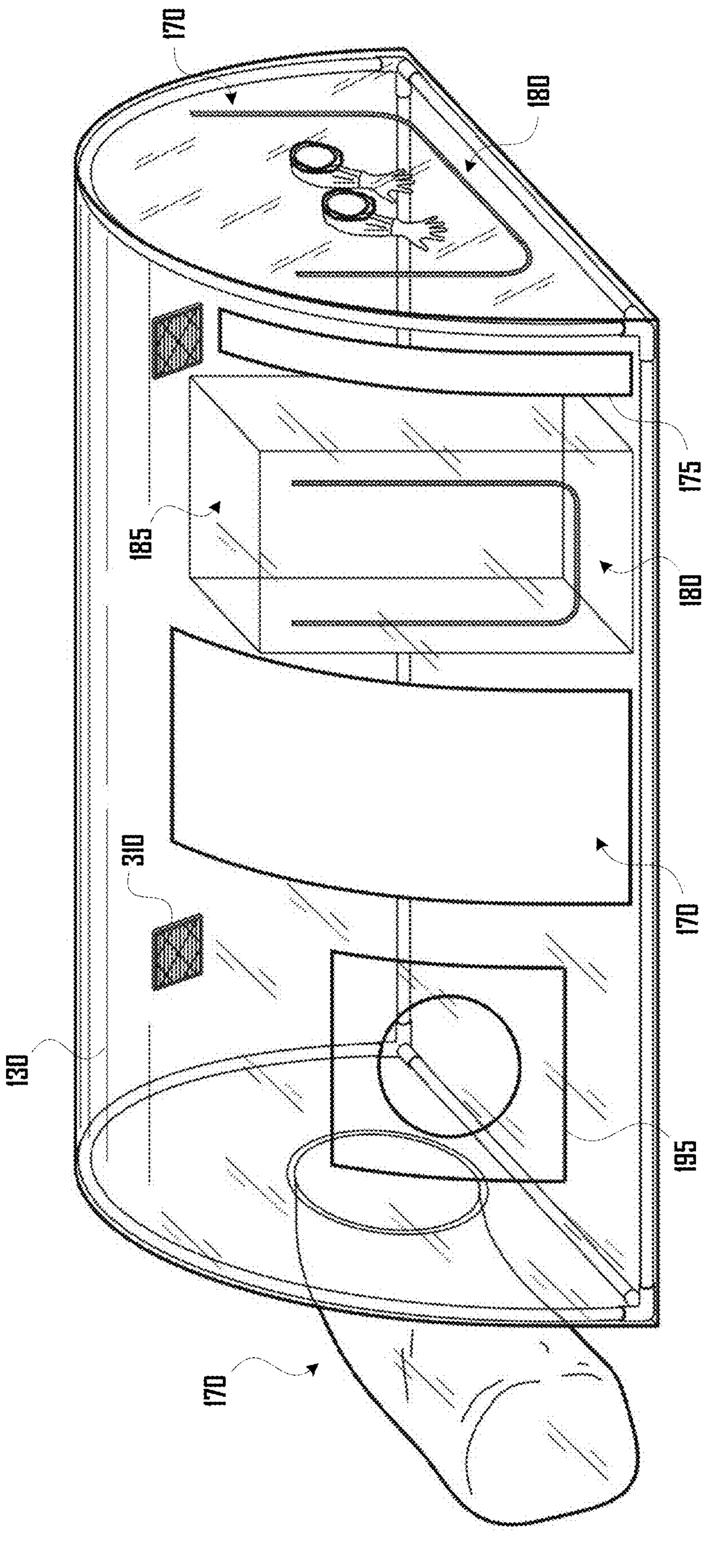
FIG. 28 illustrates another example embodiment of an isolation room system.

For example, while some embodiments, have a separate first, second and third chamber 150A, 150B, 150C, some embodiments can have a single chamber 150 such as the example of FIG. 28, which has a partial-cylinder shape. In further embodiments, an isolation room system 100 can comprise a first and second antechamber 150 for entry into a third primary chamber 150 where a patient can be isolated and a fourth and fifth antechamber 150 for leaving the third primary chamber 150.

Some embodiments of an isolation room system 100 can be small and portable and configured for isolated transport of a patient from one location to another, including through standard doors (e.g., having a height of 6'6", 6'8", 7'0" or 8'0" and a width of 2'0", 2'4", 2'8", 2'10", 3'0" or 3'6") and configured for medical transport on a small airplane or helicopter. This can be in contrast to some embodiments that can be collapsible and mobile and configured to be brought into and erected in a hospital room or room of a building, but of a size that the erected isolation room system 100 would not be removable through standard doors because of being too large. In further examples, an erected isolation room system 100 can be too large for a typical hospital room or room of a building and can instead be configured for being erected in an outdoor environment, stadium, warehouse, or other large open location.

In various embodiments, it can be desirable for an isolation room system 100 to be collapsible into a small size (e.g., 2'×2'×4') for storage and transportation, which can be desirable for deploying isolation room systems 100 during a pandemic or other event where many patients need to be isolated during treatment and existing facilities are not available or sufficient.

Also, various embodiments of an isolation room system 100 can be substantially completely transparent and/or translucent to allow visibility of the patient from all sides of the isolation room system 100 and some embodiments can include transparent or translucent windows, walls 130, interfaces 170, and the like to provide suitable visibility of an isolated patient. One example of this is the use of clear window sections situated strategically where a medical professional will be during procedures.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. An isolation room system comprising:

a rigid collapsible architecture defined by a plurality of metal poles that includes:

four parallel vertical poles that define corners of the isolation room system and contact the ground, a pair of parallel sidewall beams extending between respective pairs of the four parallel vertical poles that define the corners of the isolation room system, parallel sidewall beams extending perpendicular to the four parallel vertical poles that define the corners of the isolation room system, and a pair of parallel end-wall beams extending between respective pairs of the four parallel vertical poles that define the corners of the isolation room system;

a plurality of flexible and foldable walls supported by the rigid collapsible architecture and defined by transparent or translucent flexible polymer sheets, the plurality of flexible and foldable walls defining a polyhedron shape with walls that include two parallel end-walls, two parallel sidewalls, at least one roof wall, and a floor wall, the two parallel sidewalls having the same width that is longer than a maximum width of the two parallel end-walls, the plurality of flexible and foldable walls defining:

a chamber defined at least in part by the two parallel end-walls, the two parallel sidewalls, the at least one roof wall and the floor wall, the chamber having a volume of 410-370 cubic feet and configured to hold a bed for an isolated patient within the chamber, a plurality of lean-in glove panel interfaces that each comprise a front panel having a first and second glove extending into the chamber, the front panel rotatably coupled to a wall via a hinge that allows the front panel to rotate toward and away from the wall that the front panel is rotatably coupled to, the plurality of lean-in glove panel interfaces disposed respectively on at least both of the two parallel sidewalls and on at least one of the two parallel end-walls, a plurality of airlocks that comprise an enclosure that defines an airlock cavity, with a pair of doors that respectively provide access to the airlock cavity via the outside and inside of the isolation room system, the plurality of airlocks disposed respectively on at least both of the two parallel sidewalls, an elongated interface unit disposed on at least one of the two parallel sidewalls and configured for one or more medical devices including a stethoscope to be inserted therein to interface with the isolated patient within the chamber and configured and located for the one or more medical devices including the stethoscope to be manipulated by a user of at least one of the plurality of lean-in glove panel interfaces, the elongated interface unit defined by a material in a manner that the one or more medical devices including a stethoscope are arranged to operate through the material of the elongated interface unit, a plurality of pass-throughs disposed in at least the two parallel sidewalls and at least one of the parallel end-walls that are configured to allow various elements to extend through the at least one of the two parallel sidewalls and into the chamber, the various elements including one or more of an IV line, a ventilator tube, a monitor line, an oxygen line, a catheter line, a communication line, and a power line, an end-wall door disposed in at least one of the two parallel end- walls, the end-wall door defined by a C-shaped end-wall seal in a portion of the at least one of the two parallel end-walls where opening the end-wall seal provides for opening the end-wall door and closing the end-wall seal provides for closing the end-wall door, and a sidewall door disposed in at least one of the two parallel sidewalls, the sidewall door defined by a C-shaped sidewall seal in a portion of the at least one of the two parallel sidewalls where opening the sidewall seal provides for opening the sidewall door and closing the sidewall seal provides for closing the sidewall door, an air filtration system coupled to at least one of the two parallel end-walls, the air filtration system comprising a filter disposed within the at least one of the two parallel end-walls and further comprising a duct that extends to a fan that generates a negative pressure within the duct, which in turn pulls air from within at least the chamber through the filter, the air filtration system generating at least 15 air-exchanges-per-hour of at least the volume of the chamber and generating a negative pressure within the chamber of between −2.5 and −2.7 Pascals; and a plurality of intake filters coupled directly to the roof wall that allow for air intake into the chamber based at least in part on the negative pressure generated within the chamber;

wherein the isolation room system is collapsible and mobile and configured to:

be brought into a room via a standard sized door in a collapsed and mobile configuration, and be erected within the room to an erected size where the erected isolation room system is not removable through the standard sized door because of the erected size being too large to fit through the standard sized door, wherein the standard sized door has a height of less than or equal to 8'0" and a width of less than or equal to 3'6".

2. The isolation room system of claim 1, wherein the end-wall door and sidewall door provide an opening between the chamber and an external environment of the isolation room system, the end-wall door and sidewall door sized and configured for a prone or supine patient to be wheeled into the chamber from an external environment of the isolation room system.

3. The isolation room system of claim 1, wherein the chamber is sized and configured for the user to walk into and stand within the chamber, and wherein the chamber is sized and configured in a manner that a prone or supine patient can be wheeled into and enclosed within the chamber.

4. The isolation room system of claim 1, wherein the plurality of flexible and foldable walls further define a hug suit interface comprising a gown body having a head portion, arm portions, and a ventilation system comprising a tube that is arranged to provide air to at least the head portion of the gown body.

5. The isolation room system of claim 1, wherein the plurality of airlocks comprise a toilet airlock disposed proximate to a toilet within the chamber, the toilet airlock configured for human waste generated by the isolated patient and contained in a waste bucket to be removed from the chamber by the waste bucket being inserted into the toilet airlock from inside the chamber and removed from the toilet airlock to outside the isolation room system.

6. An isolation room system comprising:

a rigid collapsible architecture defined by a plurality of metal poles;

a plurality of flexible and foldable walls supported by the rigid collapsible architecture and defined by transparent or translucent flexible sheets, the plurality of flexible and foldable walls defining a polyhedron shape with walls that include two parallel end-walls, two parallel sidewalls, at least one roof wall, and a floor wall, the two parallel sidewalls having the same width that is longer than a maximum width of the two parallel end-walls, the two parallel end-walls, the two parallel sidewalls, and the at least one roof wall being transparent or translucent to allow visibility of an isolated patient within a chamber from all sides of the isolation room system, the plurality of flexible and foldable walls defining:

the chamber, defined at least in part by the two parallel end-walls, the two parallel sidewalls, the at least one roof wall and the floor wall, a plurality of lean-in glove panel interfaces that comprise a front panel having a first glove and a second glove extending into the chamber, the front panel rotatably coupled to a wall via a hinge that allows the front panel to rotate toward and away from a wall that the front panel is rotatably coupled to, the plurality of lean-in glove panel interfaces disposed respectively on at least one of the two parallel sidewalls and on at least one of the two parallel end-walls, one or more airlocks that comprise an enclosure that defines an airlock cavity, with a pair of doors that respectively provide access to the airlock cavity via the outside and inside of the isolation room system, the one or more airlocks disposed on at least one of the two parallel sidewalls or on at least one of the two parallel end-walls, an elongated interface unit disposed on at least one of the two parallel sidewalls and configured for one or more medical devices including a stethoscope to be inserted therein to interface with an isolated patient within the chamber and configured and located for the one or more medical devices including a stethoscope to be manipulated by a user of at least one of the plurality of lean-in glove panel interfaces, the elongated interface unit defined by a material in a manner that the one or more medical devices including a stethoscope are arranged to operate through the material of the elongated interface unit, one or more pass-throughs disposed in at least one of the two parallel sidewalls or in at least one of the two parallel end-walls that are configured to allow various elements to extend through the at least one of the two parallel sidewalls or the at least one of the two parallel end-walls and into the chamber, the various elements including one or more of an IV line, a ventilator tube, a monitor line, an oxygen line, a catheter line, a communication line, and a power line, an end-wall door disposed in at least one of the two parallel end-walls, the end-wall door defined by a C-shaped end-wall seal in a portion of the at least one of the two parallel end-walls, where opening the end-wall seal provides for opening the end-wall door and closing the end-wall seal provides for closing the end-wall door, and a sidewall door disposed in at least one of the two parallel sidewalls, the sidewall door defined by a C-shaped sidewall seal in a portion of at the at least one of the two parallel sidewalls where opening the sidewall seal provides for opening the sidewall door and closing the sidewall seal provides for closing the sidewall door;

an air filtration system coupled to at least one of the two parallel end-walls, the air filtration system comprising a filter disposed within the at least one of the two parallel end-walls and further comprising a duct that extends to a fan that generates a negative pressure within the duct, which in turn pulls air from within at least the chamber through the filter; and one or more intake filters coupled to the roof wall that allow for air intake into the chamber, wherein the isolation room system is collapsible and mobile, and wherein the end-wall seal and the sidewall seal provide an airtight seal.

7. The isolation room system of claim 6, wherein the rigid collapsible architecture defined by the plurality of metal poles comprises:

four parallel vertical poles that define corners of the isolation room system and contact the ground, a pair of parallel sidewall beams extending between respective pairs of the four parallel vertical poles that define the corners of the isolation room system, parallel sidewall beams extending perpendicular to the four parallel vertical poles that define the corners of the isolation room system, and a pair of parallel end-wall beams extending between respective pairs of the four parallel vertical poles that define the corners of the isolation room system.

8. The isolation room system of claim 6, wherein the chamber has a volume of 410-370 cubic feet and is configured to hold a bed for an isolated patient within the chamber.

9. The isolation room system of claim 6, comprising a plurality of airlocks that comprise an enclosure that defines an airlock cavity, with a pair of doors that respectively provide access to the airlock cavity via the outside and inside of the isolation room system, the plurality of airlocks disposed respectively on at least both of the two parallel sidewalls.

10. The isolation room system of claim 6, wherein the air filtration system coupled to the at least one of the two parallel end-walls comprises a filter and a duct that extends to a fan that generates a negative pressure within the duct, which in turn pulls air from within at least the chamber through the filter.

11. The isolation room system of claim 6, wherein the air filtration system generates at least 15 air-exchanges-per-hour of at least the volume of the chamber and generates a negative pressure within the chamber of less than or equal to −2.5 Pascals.

12. The isolation room system of claim 6, wherein the isolation room system is configured to:

be brought into a room via a standard sized door in a collapsed and mobile configuration, and be erected within the room to an erected size where the erected isolation room system is not removable through the standard sized door because of the erected size being too large to fit through the standard sized door, wherein the standard sized door has a height of less than or equal to 8'0" and a width of less than or equal to 3'6".

13. The isolation room system of claim 6, wherein the plurality of flexible and foldable walls further define a hug suit interface comprising a gown body having a head portion, arm portions, and a ventilation system comprising a tube that is arranged to provide air to at least the head portion of the gown body.

14. The isolation room system of claim 6, wherein the one or more airlocks comprise a toilet airlock configured for human waste generated by an isolated patient and contained in a waste container to be removed from the chamber by the waste container being inserted into the toilet airlock from inside the chamber and removed from the toilet airlock to the outside of the isolation room system.

15. An isolation room system comprising:

a rigid collapsible architecture;

a plurality of flexible and foldable walls supported by the rigid collapsible architecture that include two end-walls, two sidewalls, at least one roof wall and a floor wall, the plurality of flexible and foldable walls defining:

a chamber defined at least in part by the two end-walls, the two sidewalls, the at least one roof wall, and the floor wall, where the two parallel end-walls, the two sidewalls, and the at least one roof wall are transparent or translucent and allow visibility of an isolated patient within the chamber from all sides of the isolation room system, one or more lean-in glove panel interfaces that comprise a front panel having a first glove and a second glove extending into the chamber, the front panel rotatably coupled to a wall via a hinge that allows the front panel to rotate toward and away from a wall that the front panel is rotatably coupled to, the one or more lean-in glove panel interfaces disposed on at least one of the two sidewalls or on at least one of the two end-walls, one or more airlocks that comprise an enclosure that defines an airlock cavity, with a pair of doors that respectively provide access to the airlock cavity via the outside and inside of the isolation room system, the one or more airlocks disposed on at least one of the two sidewalls or on at least one of the two end-walls, an elongated interface unit disposed on at least one of the two sidewalls and configured for one or more medical devices including a stethoscope to be inserted therein to interface with an isolated patient within the chamber and configured and located for the one or more medical devices including a stethoscope to be manipulated by a user of at least one of the one or more lean-in glove panel interfaces, the elongated interface unit defined by a material in a manner that the one or more medical devices including a stethoscope are arranged to operate through the material of the elongated interface unit, one or more pass-throughs disposed in at least one of the two sidewalls or in at least one of the two end-walls that are configured to allow various elements to extend through the at least one of the two sidewalls or the at least one of the two end-walls and into the chamber, the various elements including one or more of an IV line, a ventilator tube, a monitor line, an oxygen line, a catheter line, a communication line, and a power line, and a plurality of doors disposed in at least one of the plurality of flexible and foldable walls, each door of the plurality of doors defined by a seal in a portion of the at least one of the plurality of flexible and foldable walls, where opening the seal provides for opening the door and closing the seal provides for closing the door; and an air filtration system coupled to at least one of the plurality of flexible and foldable walls, wherein the isolation room system is collapsible and mobile.

16. The isolation room system of claim 15, wherein the rigid collapsible architecture is defined by a plurality of metal poles.

17. The isolation room system of claim 15, wherein the plurality of flexible and foldable walls supported by the rigid collapsible architecture are defined by transparent or translucent sheets, the plurality of flexible and foldable walls defining a polyhedron shape with walls that include two parallel end-walls, two parallel sidewalls, at least one roof wall and a floor wall, the two parallel sidewalls having the same width that is longer than a maximum width of the two parallel end-walls.

18. The isolation room system of claim 15, further comprising one or more intake filters coupled to the roof wall that allow for air intake into the chamber.

19. The isolation room system of claim 15, further comprising a plurality of airlocks that comprise an enclosure that defines an airlock cavity, with a pair of doors that respectively provide access to the airlock cavity via the outside and inside of the isolation room system.

20. The isolation room system of claim 19, wherein the plurality of airlocks comprise a toilet airlock configured for human waste generated by an isolated patient and contained in a waste container to be removed from the chamber.

21. The isolation room system of claim 15, further comprising a plurality of pass-throughs disposed in at least one of the plurality of flexible and foldable walls that are configured to allow various elements to extend through the at least one of the two sidewalls and into the chamber, the various elements including one or more of an IV line, a ventilator tube, a monitor line, an oxygen line, a catheter line, a communication line, and a power line.

22. The isolation room system of claim 15, wherein the plurality of doors comprise:

an end-wall door disposed in at least one of the two end-walls, the end-wall door defined by a C-shaped end-wall seal in a portion of the at least one of the two end-walls where opening the end-wall seal provides for opening the end-wall door and closing the end-wall seal provides for closing the end-wall door, and a sidewall door disposed in at least one of the two sidewalls, the sidewall door defined by a C-shaped sidewall seal in a portion of the at least one of the two sidewalls where opening the sidewall seal provides for opening the sidewall door and closing the sidewall seal provides for closing the sidewall door.

23. The isolation room system of claim 15, wherein the air filtration system coupled to the at least one of the plurality of flexible and foldable walls comprises a filter and a duct that extends to a fan that generates a negative pressure within the duct, which in turn pulls air from within at least the chamber through the filter.

24. The isolation room system of claim 23, wherein the seals defined by the plurality of doors provide a seal with minimal openings in a manner that the negative pressure, to be applied to the isolation room system by the air filtration system, is still to be maintained with air only movable into the isolation room system via the minimal openings.

25. The isolation room system of claim 15, wherein the plurality of flexible and foldable walls further define a hug suit interface comprising a gown body having a head portion and one or more arm portions.

26. The isolation room system of claim 15, wherein the isolation room system is configured to:

be brought into a room via a standard sized door in a collapsed and mobile configuration, and be erected within the room to an erected size where the erected isolation room system is not removable through the standard sized door because of the erected size being too large to fit through the standard sized door, wherein the standard sized door has a height of less than or equal to 8'0" and a width of less than or equal to 3'6".

* * * * *